United States Patent
Mizuno et al.

(10) Patent No.: US 12,355,848 B2
(45) Date of Patent: Jul. 8, 2025

(54) DATA PROCESSING SYSTEM, DATA PROVIDING SYSTEM, EVENT INFORMATION GENERATING APPARATUS, DATA PROCESSING APPARATUS, DATA PROCESSING METHOD AND PROGRAM

(71) Applicant: NIPPON TELEGRAPH AND TELEPHONE CORPORATION, Tokyo (JP)

(72) Inventors: Shintaro Mizuno, Tokyo (JP); Kenji Shimizu, Tokyo (JP); Masahisa Kawashima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/554,090

(22) PCT Filed: Apr. 19, 2021

(86) PCT No.: PCT/JP2021/015930
§ 371 (c)(1),
(2) Date: Oct. 5, 2023

(87) PCT Pub. No.: WO2022/224322
PCT Pub. Date: Oct. 27, 2022

(65) Prior Publication Data
US 2024/0205299 A1   Jun. 20, 2024

(51) Int. Cl.
*H04L 67/50* (2022.01)
*G06F 15/173* (2006.01)
*H04L 67/1097* (2022.01)

(52) U.S. Cl.
CPC ........ *H04L 67/50* (2022.05); *G06F 15/17331* (2013.01); *H04L 67/1097* (2013.01)

(58) Field of Classification Search
None
See application file for complete search history.

(56) References Cited

U.S. PATENT DOCUMENTS

| 2005/0141444 A1* | 6/2005 | Hirai | G06F 13/28 370/313 |
|---|---|---|---|
| 2005/0229183 A1 | 10/2005 | Araujo et al. | |

(Continued)

OTHER PUBLICATIONS

Hiroshi Watanbe, MONOist, "Real-time analysis of surveillance camera images and high-precision prediction of congestion", NTT East GigaRaku Camera, Aug. 18, 2016.

*Primary Examiner* — Tonia L Dollinger
*Assistant Examiner* — Ishrat Rashid
(74) *Attorney, Agent, or Firm* — IPUSA, PLLC

(57) ABSTRACT

A data processing system includes an event information generating apparatus including generation means that receives data collected from a plurality of terminals, generates event information from the data, and transmits the generated event information to a broker device. The event information generating apparatus includes transmission means that transmits, to a data hub node device corresponding to the event information generated by the generation means, among a plurality of data hub node devices that differ for each event information, data corresponding to the event information. The data processing system includes a data processing apparatus including acquisition means that acquires event information corresponding to a specific service from a broker device. The data processing apparatus includes processing means that acquires the data from a data hub node device that stores the data corresponding to the event information, to execute processing using the data.

8 Claims, 22 Drawing Sheets

(56) References Cited

U.S. PATENT DOCUMENTS

| | | | |
|---|---|---|---|
| 2009/0106771 A1* | 4/2009 | Benner | G06F 12/1466 |
| | | | 719/313 |
| 2010/0128110 A1* | 5/2010 | Mavromatis | G08B 13/19641 |
| | | | 348/E13.001 |
| 2017/0193040 A1 | 7/2017 | Agrawal et al. | |
| 2018/0032829 A1* | 2/2018 | Kim | G08B 13/19645 |
| 2019/0340273 A1 | 11/2019 | Raman et al. | |
| 2022/0229787 A1* | 7/2022 | Veluswamy | G06F 13/1668 |

* cited by examiner

DATA PROCESSING SYSTEM, DATA PROVIDING SYSTEM, EVENT INFORMATION GENERATING APPARATUS, DATA PROCESSING APPARATUS, DATA PROCESSING METHOD AND PROGRAM

TECHNICAL FIELD

The present invention relates to a technique that performs processing on data that is collected from a plurality of terminals.

BACKGROUND ART

In recent years, data such as all kinds of sensor information has been collected and analyzed to solve various social problems such as crime prevention, accident prevention, congestion, and demand prediction.

For example, non-patent document 1 discloses a technique that analyzes an image from a monitor camera in real time to predict congestion with high accuracy.

RELATED-ART DOCUMENT

Non-Patent Document

Non-Patent Document 1:
https://monoist.atmarkit.co.jp/mn/articles/1608/18/news119.html, NTT EAST GigaRaku Camera

SUMMARY

Problem to be Solved

A problem to be solved by the invention is described below.

In conventional techniques relating to systems that provide services to collect and analyze a large number of sensor information, designation and construction are performed for a specific limited purpose. For this reason, when a service for a certain purpose is desired to be provided, it is necessary to construct an infrastructure such as a camera according to the purpose and to individually construct a system that analyzes sensor data such as acquired images for achieving the service.

For example, in a case of providing a new service by an application server in accordance with trends in the society, the new service has to be constructed from a system for a data collection and analysis. That is, in the conventional techniques, there is a problem that it is difficult to provide various any services by using data that is collected from a plurality of terminals.

The present invention is created in view of the foregoing problems, and an objective of the present invention is to provide a technique capable of providing various any services easily, by using data collected from a plurality of terminals.

Solution to Problem

According to the disclosed technique, a data processing system is provided. The data processing system includes:
an event information generating apparatus including:
generation means to receive data collected from a plurality of terminals, to generate event information from the data, and to transmit the generated event information to a broker device; and
transmission means to transmit data corresponding to the event information to a data hub node device corresponding to the event information generated by the generation means, among a plurality of data hub node devices that differ for each event information; and
a data processing apparatus including:
acquisition means to acquire event information corresponding to a specific service from a broker device; and
processing means to acquire data corresponding to the event information from a data hub node device storing the data based on the event information acquired by the acquisition means.

Effects of Invention

According to a disclosed technique, the technique capable of providing various any services by using data that is collected from a plurality of terminals is provided.

DESCRIPTION OF EMBODIMENTS

Embodiments of the present invention will be described below with reference to the drawings. Each embodiment described below is a mere example, and embodiments to which the present invention is applied are not limited to the embodiments described below.

Hereinafter, a first embodiment and a second embodiment will be described.

In both the first and second embodiments, RDMA is used as a data communication system, and accordingly, the outline of the RDMA will be first described. In the outline of the RDMA described below, the related art is illustrated for convenience of explanation of the RDMA. However, it is not necessary that the RDMA used in the present embodiment is the same as a conventional RDMA described below. As long as a system is capable of directly communicating between memories without using a CPU, a system other than the system described in the outline of the RDMA below may be used.

Outline of RDMA

In the RDMA, hardware (referred to as an RDMA-NIC in the present embodiment) corresponding to a NIC such as Ethernet is used.

A sender-side RDMA-NIC retrieves data from a preset memory region, by DMA, and transfers the data to a receiver-side ROMA-NIC. Likewise, the receiver-side RDMA-NIC writes the received data in a preset memory region, by DMA. With this arrangement, user space applications in different nodes can communicate with each other by zero-copy. In the RDMA, a network protocol is implemented in the RDMA-NIC (hardware), thereby suppressing the consumption of a CPU resource in an OS layer in a communication device that is installed in a node, while achieving low latency communications.

In conventional TCP or UDP communications that utilize a network stack for an OS layer, communications are performed by a socket. However, in the RDMA, communications are performed by a queue pair (QP).

The QP is a virtual interface that is provided by the RDMA-NIC, and the QP is comprised of a pair of send queue (SQ) and receive queue (RQ). Pieces of data relating to data transmission and data reception are respectively stored in the SQ and RQ. Each piece of data includes an address of a memory region in which data is stored, information on a length of the data, and the like. A virtual memory address or a physical memory address is used as the memory region.

Figure 1:
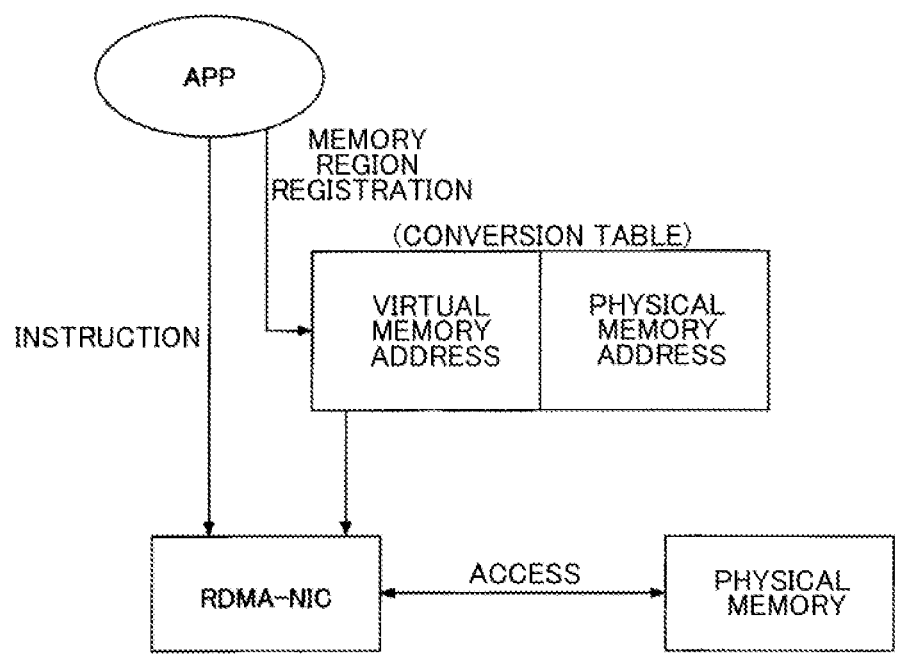
FIG. 1 is a diagram for describing the outline of RDMA.

As shown in FIG. 1, when the RDMA-NIC is used, the memory region that the RDMA-NIC accesses is registered in an OS as a memory region. When the memory region is registered, a conversion table associating the virtual memory address with each physical memory address is created and then transferred to the RDMA-NIC, and thus the RDMA-NIC can recognize a part of the virtual memory address space of the user program (APP). The RDMA-NIC can determine a physical memory address to be accessed, by referring to the conversion table during transmission and reception. Therefore, data transfer can be performed with minimal use of the CPU of the OS layer in a communication device installed in the node.

As described above, the virtual memory address is used as the memory region as an example. The physical memory address may be used as the memory region. The memory region that utilizes the physical memory address is referred to as a physical address memory region (PA-MR). When the PA-MR is used, a transmission request or reception request, which includes information of: the physical memory address of the memory region that stores data; and/or a physical memory address size, is stored in the SQ or RQ. The physical memory address can be accessed based on the transmission request or reception request.

Basic Model of Transport Layer

Figure 2:
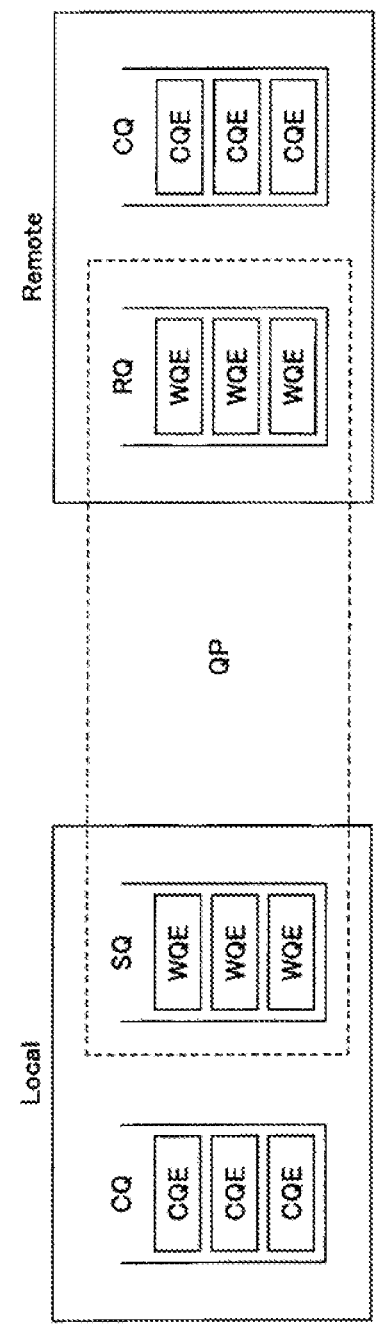
FIG. 2 is a diagram for describing the outline of the RDMA.

Hereinafter, a communication model for the transport layer in the RDMA between a local node and a remote node will be described with reference to FIG. 2. As shown in FIG. 2, in the transport layer of the RDMA, a queue pair (QP) is formed between local and remote sides. As described above, the QP is a set of a send queue (SQ) and a receive queue (RQ).

A communication unit of the RDMA is a communication request that is referred to as a work request (WR), and the communication request is stored in the SQ or the RQ in a unit of a work queue element (WQE). An operation to enqueuing one or more WQs is performed in accordance with an instruction from a user program (APP shown in FIG. 1). An operation for transmission or reception in accordance with the communication request is performed asynchronously with the operation to enqueue one or more WQs, by using the RDMA-NIC.

The WR includes a Send WR, which is a transmission request, and a receive WR, which is a received request. In the Send WR, a memory region where data to be sent is specified by one or more WQEs, and the WQEs are enqueued in the SQ. In the receive WR, a memory region where data is to be received is specified by one or more WQEs, and the WQEs are enqueued in the RQ. The WQEs can be enqueued with FIFO (first-in-first-out) by the number of queue depths for the SQ or RQ.

When processing for the WR is normally completed between the QP, a completion queue entry (CQE) indicating normal completion is enqueued in a CQ (Completion Queue) corresponding to each of the SQ and the RQ. When processing for the WR is interrupted due to an error between the QP, the CQE indicating an error is enqueued in the CQ. When the CQE indicative of the normal completion is confirmed, the WQEs in each of the SQ and RQ are deleted, and a subsequent WR can be received.

Service Type and Operation Type in RDMA

In accordance with categories of reliable/unreliable, and connection/datagram, service types in the RDMA are broadly classified into four service types, i.e., reliable connection (RC), reliable datagram (RD), unreliable connection (UC), and unreliable datagram (UD). The RC and UD are the most commonly used.

The RC guarantees a sequence and reachability for messages, by confirming the success or failure of communication with an ACK/NAK and, a mechanism of retransmission. Also, the RC is a connection type, and one-to-one communication is performed between the QP of the local and remote sides.

Although the UD has no mechanism for acknowledgment and retransmission, unlike the RC, it is possible to perform multi-to-multi-way communication such as transmission to a plurality of QP and reception from a plurality of QP by designating a destination for each communication.

The operation types in the RDMA are broadly classified into four operation types, that is, SEND, RDMA Write (with Immediate), RDMA Read, and ATOMIC operations. All of these can be used in RC, and only the SEND can be used in the UD. Even in the same operation type, the way of enqueuing one or more WQEs and/or one or more CQEs differs depending on the service type.

In the RDMA communication according to the present embodiment (each of the first embodiment and the second embodiment), any service type and any operation type can be used. Each operation type will be described below.

SEND Operation Scheme (RC)

Figure 3:
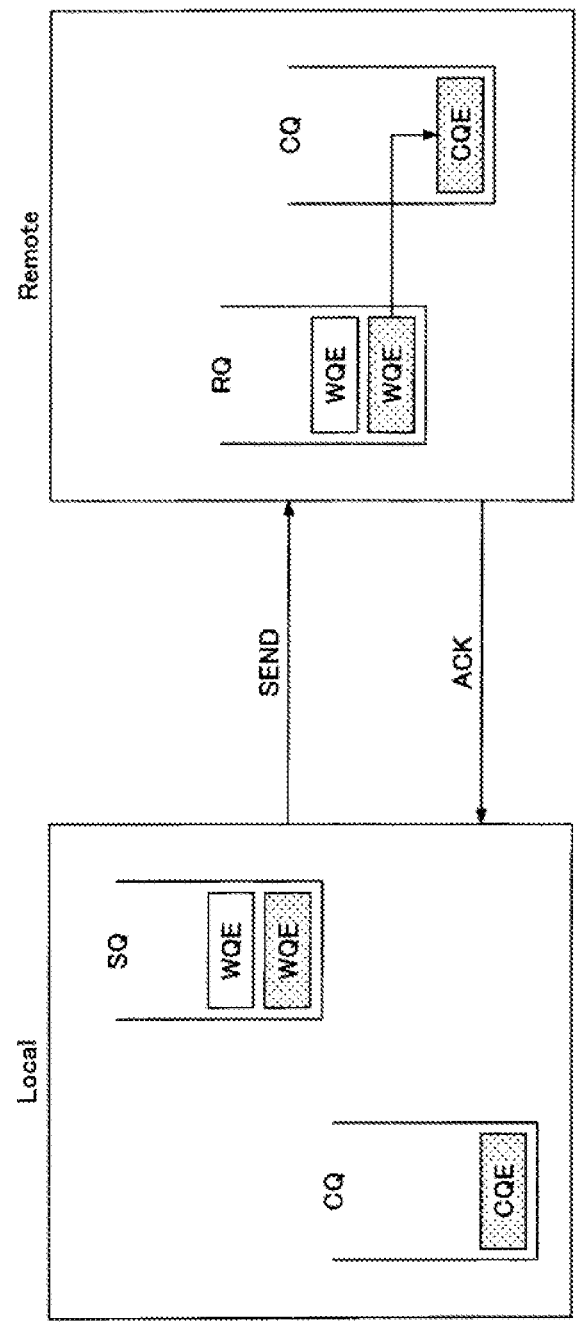
FIG. 3 is a diagram for describing the outline of the RDMA.

FIG. 3 shows an outline of the operation of the SEND operation scheme (RC). The SEND operation scheme (RC) is a basic transmission and reception model of RDMA, and is a model in which a local side transmits data to a remote side.

As shown in FIG. 3, the SQ is prepared on the local side, the RQ is prepared on the remote side, and one or more WQEs are enqueued in each of the SQ and the RQ. The local side takes out a given WOE in the SQ from a head, and transmits the data in the memory region designated therein by the SEND only.

As for the data received by the remote side, a given WOE in the RQ is taken out from a head, and is stored in the memory region designated therein. When reception is successfully performed, a COE is enqueued in the CQ corresponding to the RQ, and an ACK is returned to the local side. When the local side receives the ACK, a COE is enqueued, and the WOE in the SQ is released.

SEND Operation Scheme (UD)

Figure 4:
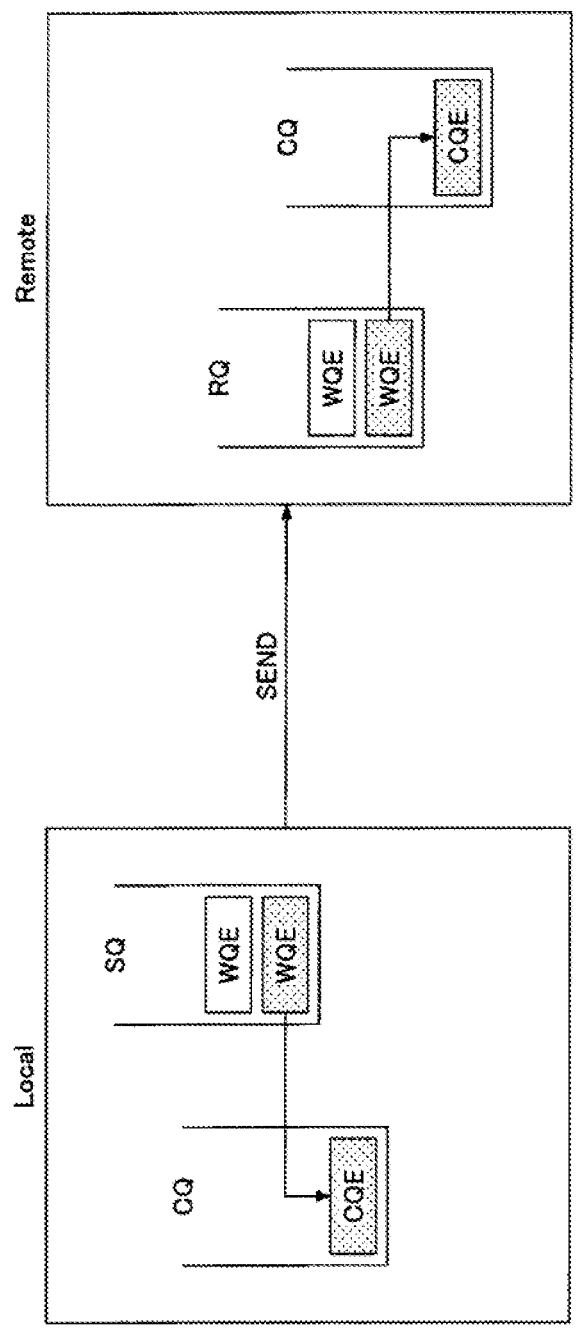
FIG. 4 is a diagram for describing the outline of the RDMA.

FIG. 4 shows an outline of the operation of the SEND operation scheme (UD). The SEND operation scheme (UD) is different from the SEND of RC, and is a scheme of not performing a confirmation response. As shown in FIG. 4, the SQ is prepared on the local side, the RQ is prepared on the remote side, and one or more WQEs are enqueued in each of the SQ and the RQ. When the communication is ready, the local side transmits data by the SEND-only. When the transmission of the data is completed, a COE is enqueued in the CQ corresponding to the SQ. When the reception is successfully performed on the remote side, a COE is enqueued in the Co corresponding to the RQ.

RDMA Write Operation Scheme (RC)

Figure 5:
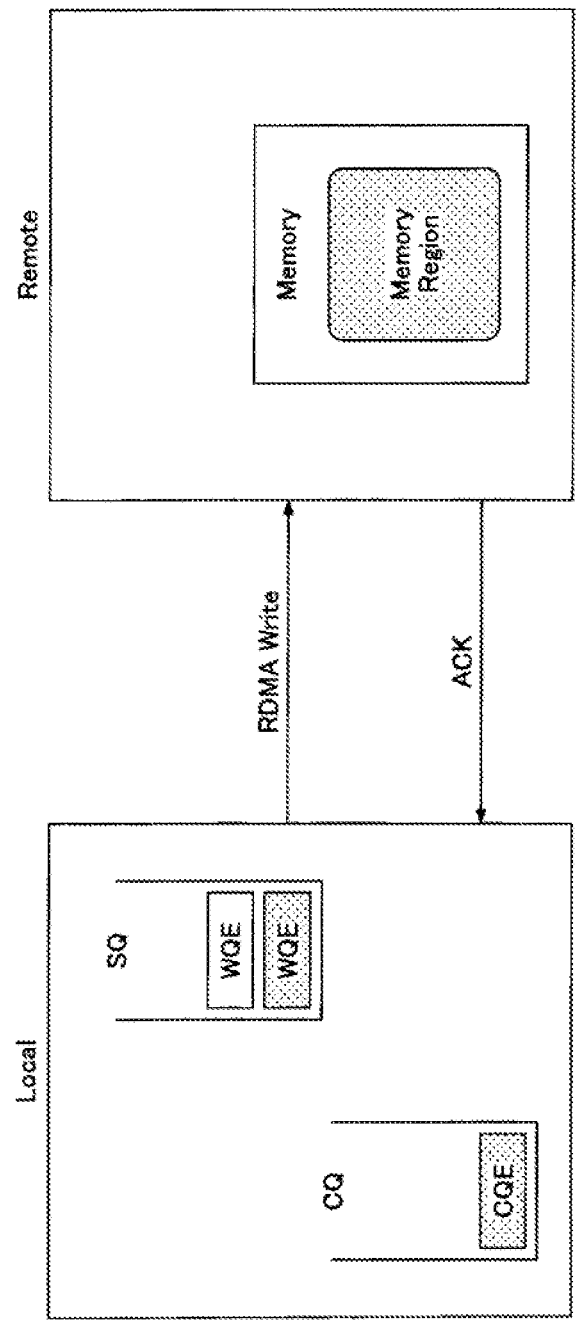
FIG. 5 is a diagram for describing the outline of the RDMA.

FIG. 5 shows an outline of the operation of the RDMA Write operation system (RC). The RDMA Write operation (RC) is a system in which the local side transmits data to the remote side, as in the case of the SEND, but differs from the SEND in that the data is directly transferred to the memory region of the Remote.

The local side prepares the SQ and enqueues one or more WQEs. At this time, a memory region on the remote side to be written is designated, in addition to a memory region for data to be transmitted to a given WOE. Although the memory region (Memory Region) for the RDMA is secured on the remote side, it is not necessary to enqueue one or more WQEs in the RQ.

When the communication is ready, the local side transmits data by RDMA Write. The data is directly written in the memory region on the remote side. When the reception is successfully performed on the remote side, an ACK is returned to the local side. When the local side receives the ACK, a COE is enqueued and a WQE in the SQ is released.

RDMA Write w/Imm Operation Scheme (RC)

Figure 6:
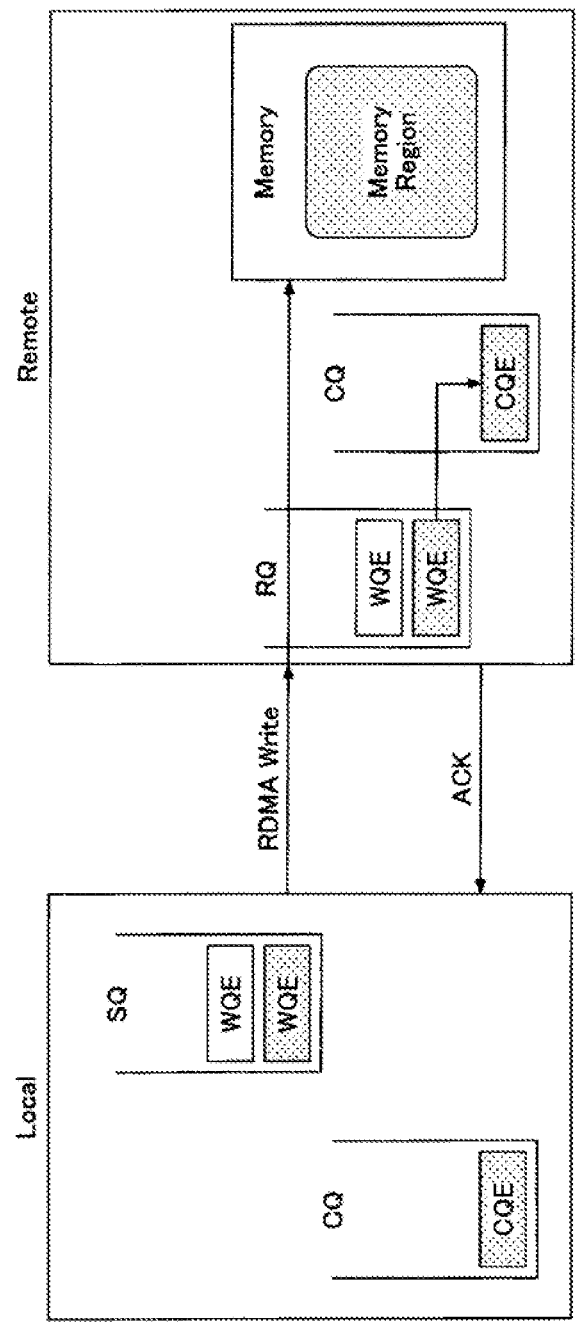
FIG. 6 is a diagram for describing the outline of the RDMA.

FIG. 6 shows an outline of the operation of the RDMA Write w/Imm operation system (RC). In the RDMA Write described with reference to FIG. 5, there is a disadvantage that the remote side cannot detect a change in the memory region when data is received.

On the other hand, in the RDMA Write w/Imm (RDMA Write with immediate) scheme shown in FIG. 6, RQ and WOE are set on the remote side, and the CQE at the time of successful reception of the RDMA Write is waited for to cope with the disadvantage.

In the WQE of the local SQ, a special field imm_data is set in addition to the memory region of data to be transmitted and the memory region of the remote side to be written. When the reception is successful on the remote side, a CQE including the imm_data is enqueued in the CQ corresponding to the RQ. By using this, it is possible to detect a change in any memory region.

RDMA Read Operation Scheme (RC)

Figure 7:
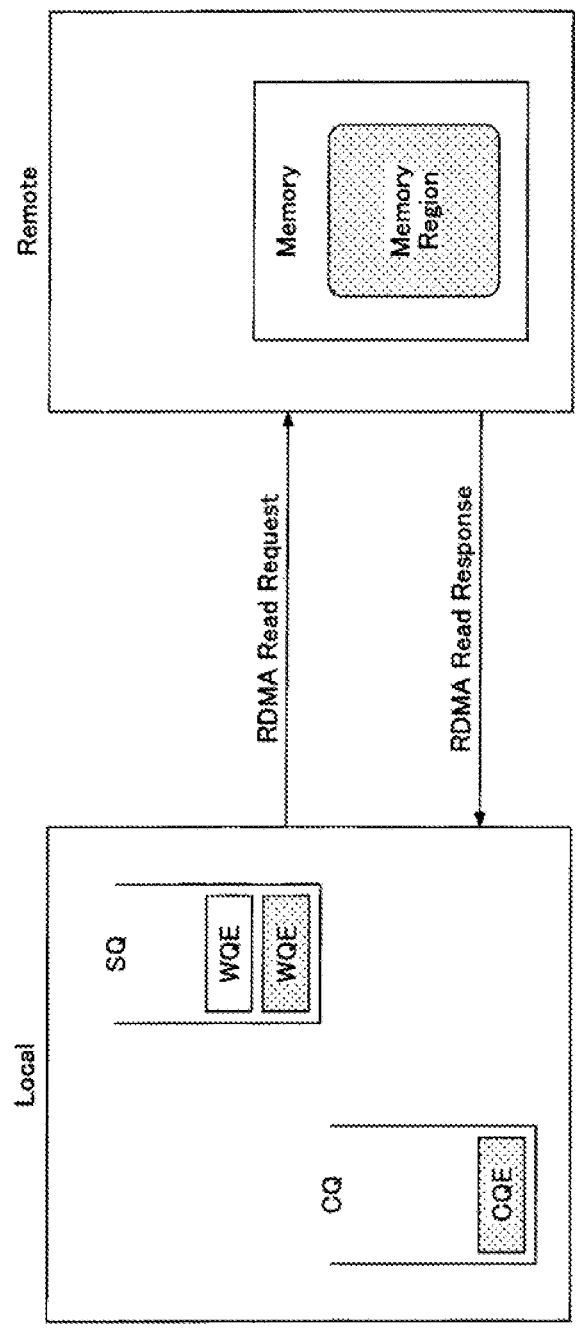
FIG. 7 is a diagram for describing the outline of the RDMA.

FIG. 7 shows an outline of the RDMA Read operation scheme (RC). As shown in FIG. 7, the RDMA Read operation system (RC) is a scheme in which data is drawn from the remote side to the local side.

The local side prepares the SQ, and enqueues one or more WQEs. At this time, a memory region for receiving data is designated in each WQE. Further, a memory region on the remote side to be read is also designated. Although the memory region (Memory Region) for the RDMA is secured on the remote side, it is not necessary to enqueue one or more WQE in the RQ.

When the communication is ready, the local side requests data reading by the RDMA Read Request. When the remote side receives this, data in the remote side memory region is directly transmitted to a set local-side memory region by the RDMA Read Response. The packet of the RDMA Read Response includes an ACK extension header, and when the local side receives an ACK, the COE is enqueued so that the WQE in the SQ is released.

Hereinafter, a first embodiment and a second embodiment will be described.

First Embodiment

Figure 8:
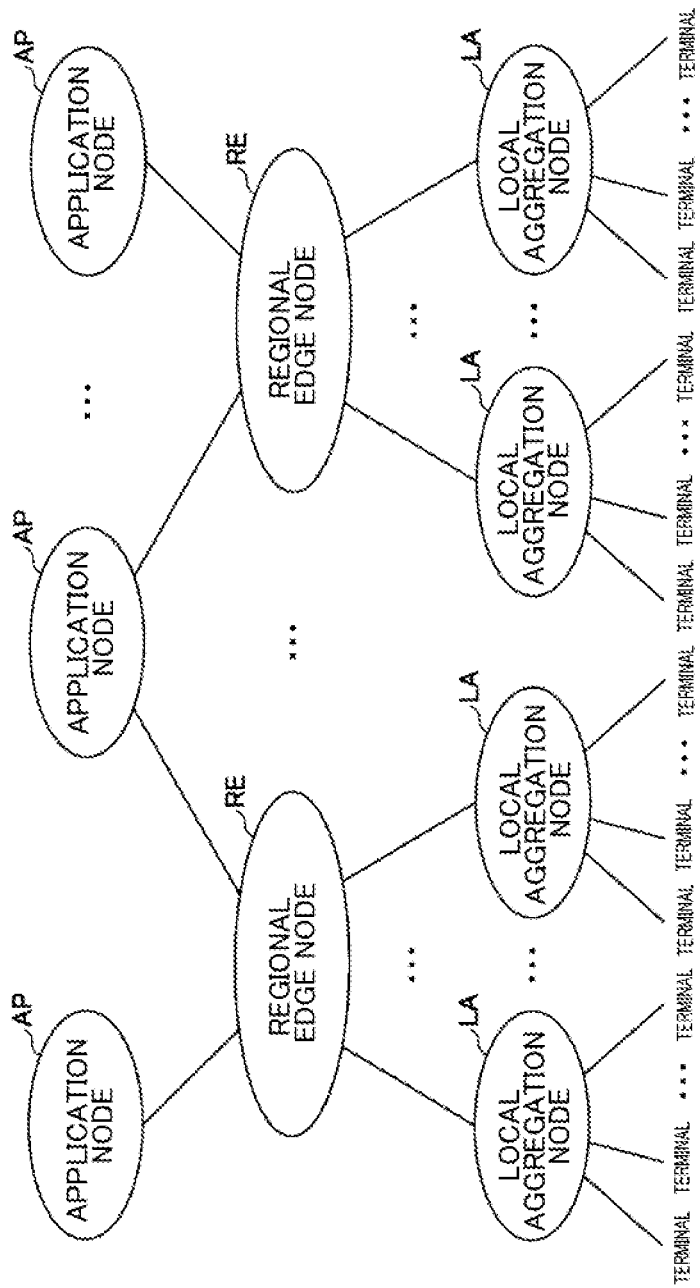
FIG. 8 is a diagram showing a configuration example of the whole communication system according to a first embodiment.

First, the first embodiment will be described. FIG. 8 shows an example of a whole configuration of the communication system according to the present embodiment.

As shown in FIG. 8, the communication system includes a local aggregation node (LA) at which a plurality of terminals are coupled, a regional edge node (RE) at which a plurality of local aggregation nodes (LA) are coupled, and an application node (AP).

In the first embodiment, it is assumed that the terminal is a camera. It is assumed that the regional edge node (RE) is installed in each area such as Tokyo and Osaka. A plurality of local aggregation nodes (LA) exists for each area, and each local aggregation node (LA) accommodates a plurality of terminals (for example, cameras). Each node is connected, for example, by an optical network.

Overview of Operation, Subjects, and the Like

In the first embodiment, it is envisaged that the system configuration shown in FIG. 8 constitutes, for example, a multi-camera multipurpose AI platform. The same applies to the second embodiment.

Specifically, in the platform, a large number of cameras are installed in a commercial building or an office building, and image data collected from the cameras are analyzed. As the contents of the analysis, for example, the number of persons existing in the area is counted to be useful for congestion avoidance, evacuation guidance, and the like. Also, by counting the number of people including their attributes, it is possible to forecast demand, optimize inventory and store staffing, analyze the effectiveness of events, etc., and plan events and advertising. Further, by detecting a person who has a suspicious behavior, it is useful for crime prevention.

Also, in view of the development of the next generation town, by installing a large number of cameras on a road, it is also possible to control a micro mobility vehicle automatically, prevent an encounter collision at an intersection, and allocate a micro mobility vehicle to a place where many people exist automatically.

Figure 9:
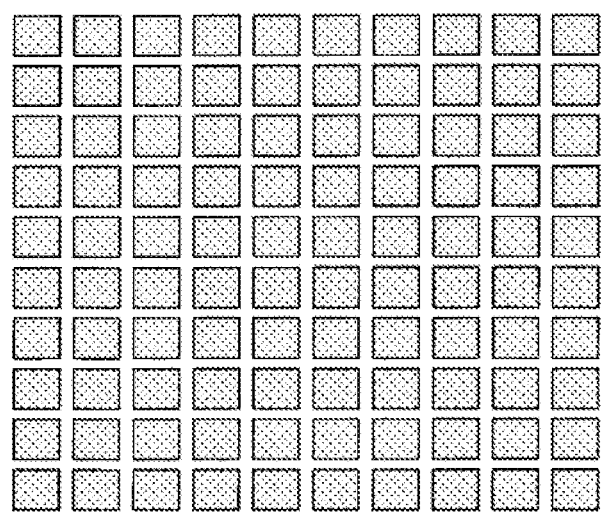
FIG. 9 is a diagram for describing the implementation for illustration purpose.

More specifically, as shown in FIG. 9, for example, a block of 500 m×500 m having a road in a lattice shape with 50 m width is assumed, and cameras are installed at every 10 m interval in the following specifications.

Connection scheme: Wired Ethernet (registered trademark)
Resolution: Full HD (2 MB in Raw)
Frame rate: 15 FPS
Code: Motion JPEG 60 Mbps 20 paths exist, and 50 cameras are installed on one path. In this case, a total number of cameras is about 1000. When outputs from all the cameras are merged, 60 Gbps and 15000 FPS are obtained. A total rate of 60 Gbps is calculated by 500 KB per one frame×1000 cameras×15 FPS.

Figure 10:
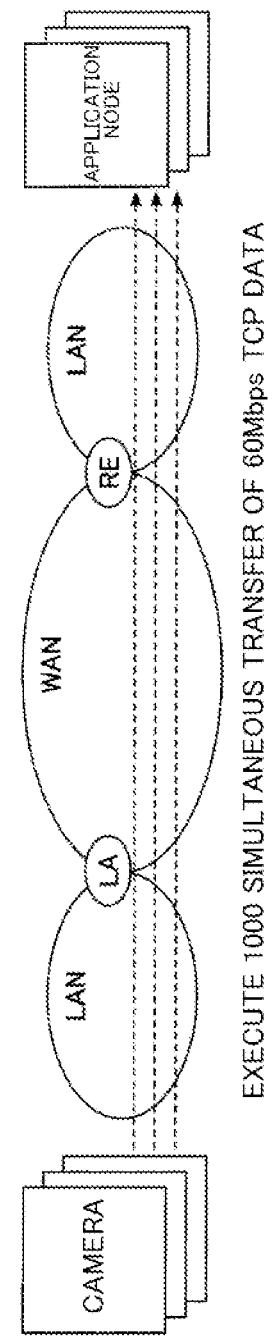
FIG. 10 is a diagram for describing the problem.

This data is input to, for example, one local aggregation node (LA) shown in FIG. 8. FIG. 10 shows a situation in which a data flows from a given camera to the application node (AP) via the local aggregation node (LA) and the regional edge node (RE). As shown in FIG. 10, 1000 cameras transfer TCP data of 60 Mbps simultaneously.

For example, it is assumed to implement the above-mentioned data transfer by installing an information communication device in each of the LA and the RE, where a CPU of the information communication device executes a program for transmitting and receiving data, while utilizing a TCP/IP service on an OS layer. However, the TCP/IP service on the OS layer autonomously performs a flow control through the OS layer, without optimizing communications according to a given size and update rate of data to be transferred, and then the TCP/IP service buffers the data.

With this arrangement, in the example of the data transfer shown in FIG. 10, if an amount of the transfer data becomes larger, a CPU load becomes larger, and then the data transfer requires the time for the flow control.

Although load distribution is achieved by constructing a load distribution layer, a considerable number of servers is required for the load distribution layer, and thus a CPU load as the whole system is increased. Also, latency is increased by the load distribution layer.

Therefore, in the first embodiment, as a communication scheme between the LA and the RE, the RDMA capable of directly performing data communication between memories is used. That is, each of the local aggregation node (LA) and the regional edge node (RE) is provided with an information communication device provided with the RDMA-NIC. In the information communication device, the virtual memory region of the RDMA is secured (registered) in accordance with the size of the collected data, and the network band is allocated in accordance with the size of the virtual memory region and the update rate. This allocation can be dynamically performed. As a scheme for dynamically allocating the network band, there is, for example, the following scheme. The following schemes are examples, and other schemes may be used.

In the layer of the physical layer of light, the number of wavelengths of light is dynamically changed.

In the layer (layer 1) of the transmission device, a frame change in OTN, a band change in finer granularity by ODUFlex, a speed step change in SONET/SDH, and a rate change in finer granularity by VC (Virtual Concatenation) are performed.

In a higher layer, the band control by a traffic engineering function is performed by MPLS-TE and RSVP-TE.

In a protocol in which the transmission speed is increased by the number of streams in parallel at the same time, parallelism adjustment in data transfer is performed.

The band control through the network is not performed, but a traffic shaper or the like is used to control the band control or the like in a transfer node.

Figure 11:
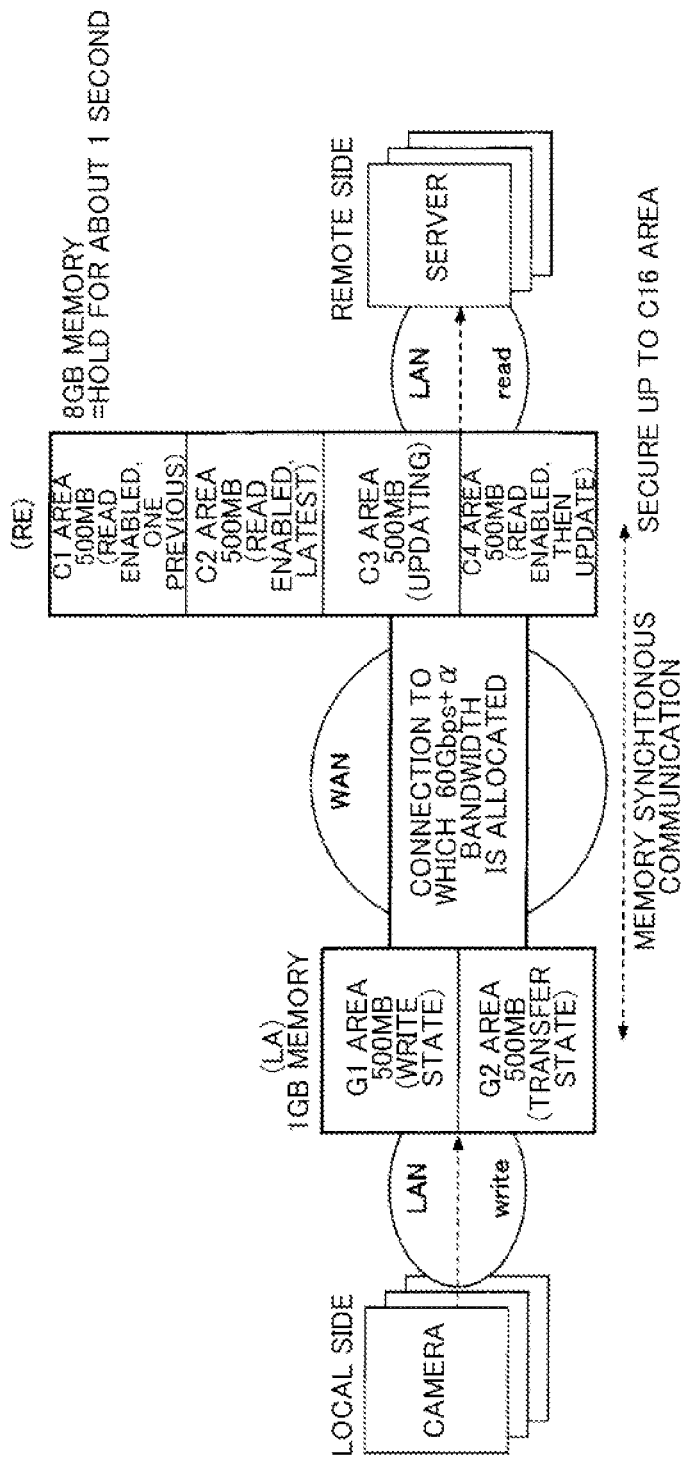
FIG. 11 is a diagram for describing an implementation model.

FIG. 11 shows an example of communication using the RDMA between the local aggregation node (LA) and the regional edge node (RE), under the assumptions that the cameras are arranged as described above. FIG. 11 shows a memory used by the RDMA in each of the local aggregation node (LA) and the regional edge node (RE).

As mentioned above, a total rate of 60 Gbps is defined by 500 kB per one frame×1000 cameras×15 FPS, and 1000 cameras have a size in the range of 500 MB. With this arrangement, the information communication device on a local (ground) side secures a memory region of 500 MB. However, during data transfer, the local side needs to write image data of a subsequent frame in the memory, and thus totally forms two areas, i.e., an area for enabling the writing in the memory and an area for enabling the transfer through the memory. That is, as shown in FIG. 11, two memory regions that include a G1 area, which is a memory region of 500 MB, and a G2 area, which is a memory region of 500 MB, are formed. Each memory region is updated at 15 Hz. It should be noted that when at least two memory regions are maintained, it is sufficient.

In the information communication device that is a remote (cloud)-side regional edge node (RE), it is assumed that data is held for a certain time period for the purposes of data analysis or the like, when the data is transferred to an application node.

With this arrangement, in the information communication device that is the regional edge node (RE), a required number of memory regions is formed in accordance with a data holding time. For example, if the data holding time is 1 second, 16 (=15+1) memory regions are secured. In the example of FIG. 11, four regions consisting of C1 to C4 regions are secured.

In the network between the LA and the RE, a network band (60 Gbps+α) is allocated in accordance with a total rate of 60 Gbps of data. Here, α indicates a margin for the band to be allocated. When the extent to which a header overhead due to a protocol through which encapsulation is performed, or to which any other control message is included is allocated, it is sufficient. For example, the above extent is about 10%.

When the RDMA communication of 60 Gbps cannot be realized between a pair of RDMA nodes, in a case where multiple memories are synchronized in a parallel manner by division of each memory region, it is sufficient. In this case, for example, an optical path may be shared by label multiplexing or the like.

Device Configuration

Figure 12:
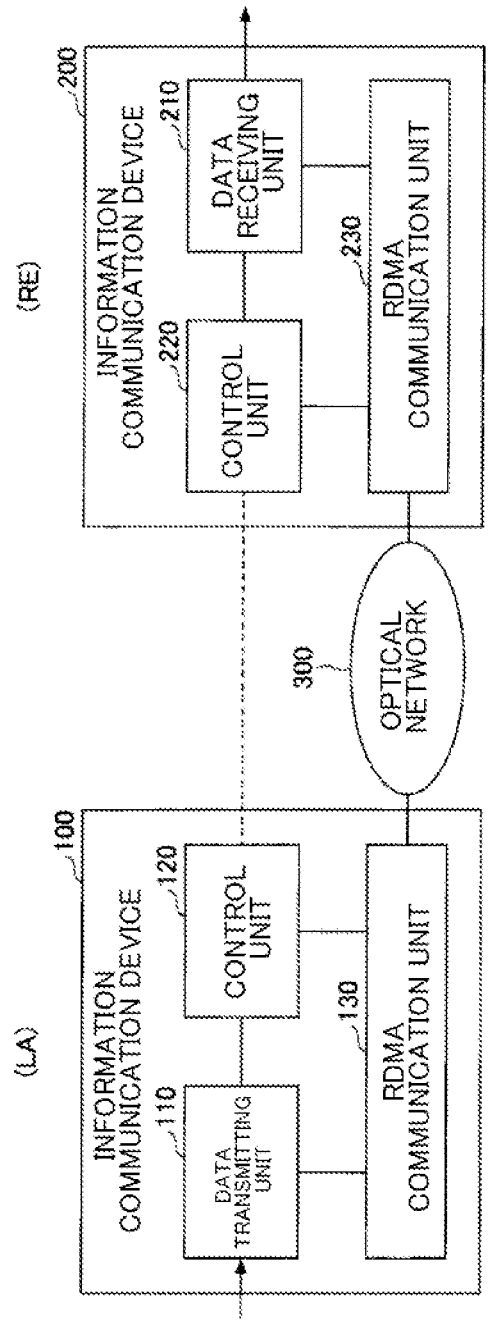
FIG. 12 is a diagram showing an example of a functional configuration of the communication system according to the first embodiment.

FIG. 12 is a diagram showing a functional configuration of the the LA-side information communication device 100 and the RE-side information communication device 200. The information communication device 100 and the information communication device 200 are coupled to each other by a communication network.

As shown in FIG. 12, the LA-side information communication device 100 includes a data transmission unit 110, a control unit 120, and an RDMA communication unit 130. The data transmission unit 110 and the control unit 120 are functional units implemented by a CPU, an FPGA, a physical memory, a user program, and the like. The RDMA communication unit 130 corresponds to an RDMA-NIC.

The data transmission unit 110 receives data from the terminal side, stores the data in a physical memory, and issues a transmission instruction to the RDMA communication unit 130. The sending of the transmission instruction corresponds to enqueuing of a transmission request in a transmission queue in the RDMA communication unit 130.

The control unit 120 identifies a size, and an update rate, of data to be transferred, by monitoring the data transmission unit 110 or acquiring information on a terminal side. The control unit 120 determines the size (referred to as an update size because updating is performed in units of the determined size) of a memory region to be used by the RDMA communication unit 130, based on a data size, to secure the memory region. The control unit 120 also determines a band of a network path via which data communication between the LA and the RE is performed by the RDMA communication, based on the determined size and update rate of the data, to thereby secure the band.

That is, the control unit 120 includes determination means that operates in a first layer, for determining an update size of a memory region used to hold data on the basis of information on the data that is transmitted from a plurality of terminals, and includes setting means for setting a band of a network path of a second layer necessary for communication with a receiver side on the basis of the update size and the update rate of the data. A given layer used to perform size determination processing, and a given layer used to perform processing related to the RDMA communication are different from each other. For this reason, they are referred to the first layer and the second layer.

The information (data size, update rate, or the like) identified by the LA-side control unit 120 is indicated to a control unit 220 of the RE-side information communication device 200, and the control unit 220 performs processing, such as securing of a memory region, on the RDMA communication unit 230.

With respect to the identifying of the size of the data and the update rate, for example, the control unit 120 can identify a number of terminals and an amount of data that is sent by each terminal at the update rate, based on received data. Further, as shown in FIG. 13, an operation system 250 is provided, and each of the control unit 120 and the control unit 220 may receive, from the operation system 250, explicit information such as a number of terminals, and a size and an update rate of data that is transmitted from each terminal, to thereby identify the update rate and data size of the data.

Figure 13:
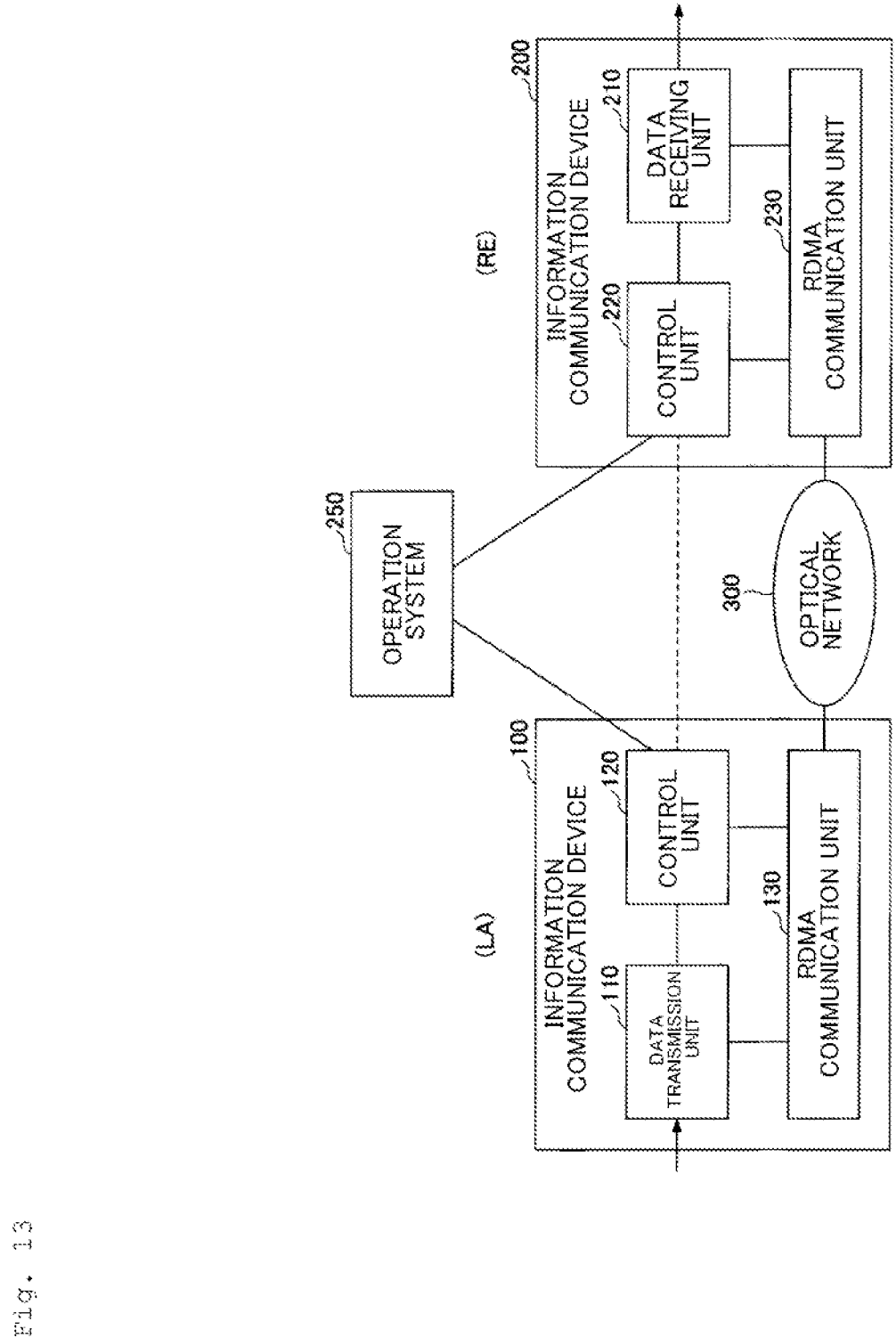
FIG. 13 is a diagram showing the functional configuration example of the communication system according to the first embodiment.

As shown in FIGS. 12 and 13, the RE-side information communication device 200 includes a data receiving unit 210, a control unit 220, and an RDMA communication unit 230. The data receiving unit 210 and the control unit 220 are functional units that are each implemented by a CPU, an XPU, a physical memory, a user program, and the like. The RDMA communication unit 230 corresponds to an RDMA-NIC. Here, various processing units including the GPU and the like are each referred to as the XPU in general.

The data receiving unit 210 receives data from an LA-side, through the RDMA communication unit 230, stores the data in the physical memory, and then executes data processing by, for example, the XPU.

The data receiving unit 210 may acquire data from the LA-side, by executing the RDMA Read operation, to store the data in the physical memory. With this arrangement, it is possible to address a situation where the LA side is relatively powerless in terms of device configurations.

As described above, when any one subject of the LA side and the RE side receives data, it is sufficient.

The control unit 220 identifies the size and update rate of data, on the basis of information that is received from the RE-side control unit 120 or the operation system 250, secures a memory region used by the RDMA communication unit 230, on the basis of the identified information, and then secures a network band. The control unit 220 calculates a time period for holding data in the RE, on the basis of a data processing time or the like, and then secures a number of memory regions corresponding to the data holding time.

Detailed Example

Next, an example of a detailed structure and a detailed operation in the first embodiment will be described with reference to FIG. 14. In the communication system shown in FIG. 14, the information communication device 100 is provided on the LA side, and the information communication device 200 is provided on the RE side. In the example shown in FIG. 14, one LA is connected to the RE, but this is an example. A plurality of LAs can be connected together. The information communication device 100 in the LA may be called a proxy server. This is because the information communication device 100 has a function of enabling RDMA communication on the network even when a terminal (camera or the like) does not support RDMA.

An optical packet transponder 14 is connected to the information communication device 100, and an optical packet transponder 26 is connected to the information communication device 200. The optical packet transponder 14 and the optical packet transponder 26 are connected by an optical network 300. The LA-side optical packet transponder 14 converts an electric signal outputted from an RDMA-NIC 12 of the information communication device 100 into an optical signal and transmits the optical signal. The RE-side optical packet transponder 26 converts an optical signal received from the optical network 300 into an electric signal, and transmits the electric signal to an RDMA-NIC 24 of the information communication device 200.

Further, 80 cameras are connected to the LA-side information communication device 100 via a LAN. It is assumed that the data transfer from the camera is only a few hundred meters, even if it is TCP/IP, so it is assumed that high speed data transfer is possible.

Figure 14:
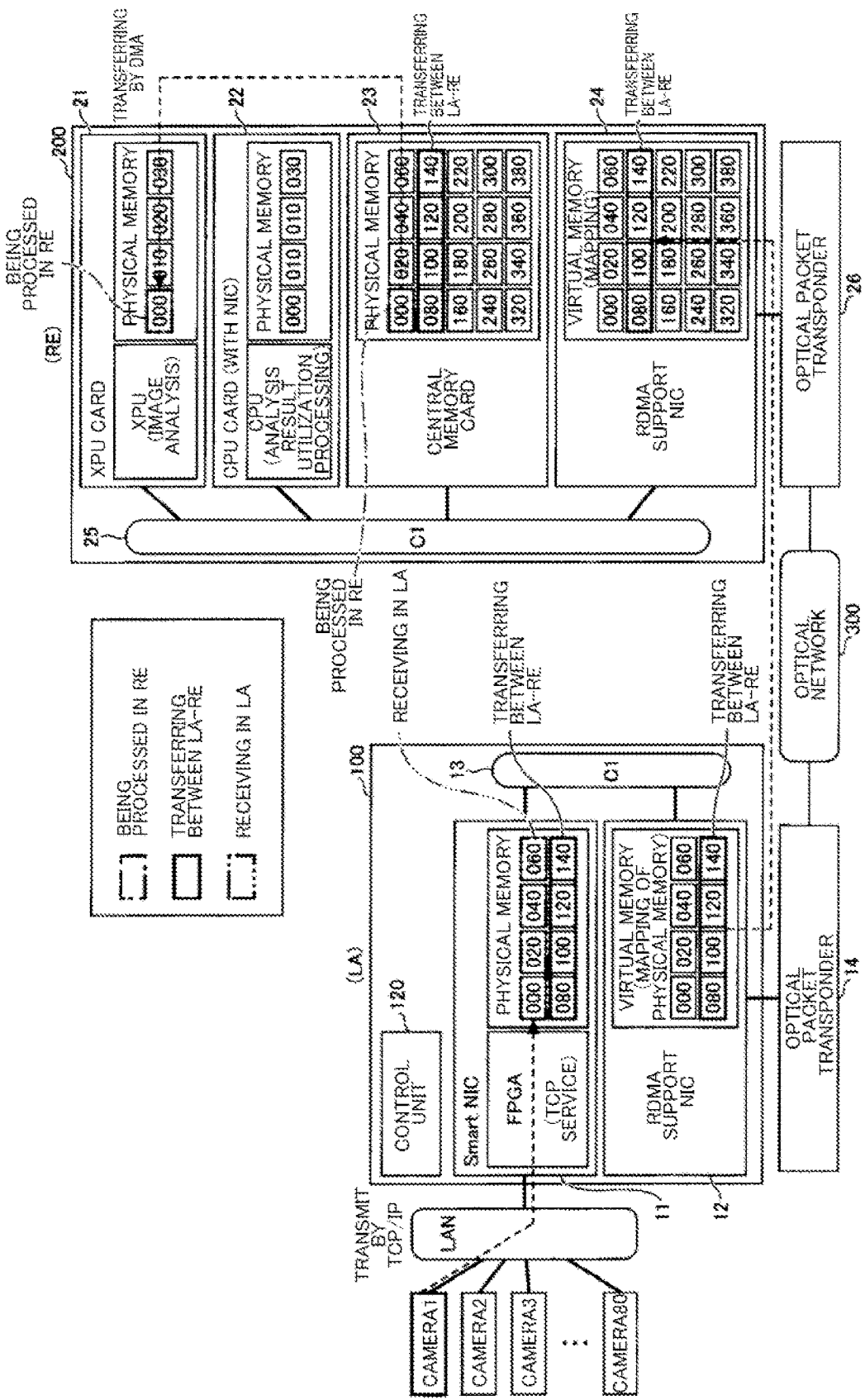
FIG. 14 is a diagram for describing an operation example of the communication system according to the first embodiment.

In FIG. 14, in order to facilitate the explanation of the state of the memory region, each of the information communication device 100 and the information communication device 200 has a configuration close to physical mounting.

That is, the information communication device 100 is provided with a control unit 120, a smart NIC 11, and an RDMA-NIC 12, the smart NIC 11 and the RDMA-NIC 12 are connected by a CI (Component Interconnect) 13.

The smart NIC 11 includes an FPGA and a physical memory. The FPGA has a TCP service function, receives data outputted from the cameras 1 to 80 and stores the data in a memory region secured by a control unit 120 in a physical memory.

The RDMA-NIC 12 is hardware for performing the RDMA communication as described above. FIG. 14 shows a memory region of a virtual memory which is a mapping of a physical memory.

The control unit 120 designates a virtual memory address corresponding to the memory region, and thereby the information communication device 100 secures the memory region to be accessed by the RDMA-NIC 12. Since the virtual memory is mapping of the physical memory, a memory region secured by the control unit 120 is a memory region in the virtual memory and a memory region in the physical memory.

The information communication device 200 includes a control unit 220, an XPU card 21, a CPU card 22, a central memory card 23, and an RDAM-NIC 24, and the XPU card 21, the CPU card 22, the central memory card 23, and the RDAM-NIC 24 are connected by a CI 25.

The XPU card 21 includes, for example, an XPU for performing image analysis and a physical memory. The CPU card 22 is provided with a CPU and a physical memory for performing the utilization processing of the analysis result. The central memory card 23 is provided with a physical memory.

The central memory card 23 may be a high-speed storage on a so-called mother board in the PC architecture or an independent storage such as an NVME Array. The physical memory can be used without increasing a CPU load by DMA-transferring data from the RDMA-NIC 24 to the physical memory on the central memory card 23 (mother board) without using the CPU. Further, multiple central memory cards may be used in a RAID configuration for higher performance and HA.

In a case where the NVME Array is used as the central memory card 23, it may be connected to a functional unit of a computing system at a high speed by interconnection.

The RDMA-NIC 24 is hardware for performing the RDMA communication as described above. FIG. 14 shows a memory region of a virtual memory which is a mapping of a physical memory. As described above, the control unit 220 designates the virtual memory address corresponding to the memory region, thereby securing the memory region to be accessed by the RDMA-NIC 12 in the information communication device 200. Since the virtual memory is mapping of the physical memory, a memory region secured by the control unit 220 is a memory region in the virtual memory and a memory region in the physical memory.

When the number of cameras that is connected to the information communication device 100 is increased, a case or the like where the control unit 120 in the LA-side information communication device 100 increases a memory region to be accessed by the RDMA-NIC 12, and a connection band between the LA and the RE, at the same rate occurs. On the contrary, when the number of cameras is reduced, a case or the like where the control unit 120 decreases the memory region and the connection band at the same rate occurs. The memory region to be accessed by the RDMA-NIC 12 and the memory region to be accessed by the RDMA-NIC 12 and the connection band between the LA and the RE are increased or decreased in accordance with an increasing or decreasing number of cameras. An amount of the memory region, and information on the connection band, determined by the control unit 120 are also indicated to the control unit 220 in the RE-side information communication device 200, and in the RE-side information communication device 200, the control unit 220 increases or decreases the memory region to be accessed by the RDMA-NIC 24, and the connection band between the LA and the RE, based on the indicated information.

The control unit 120 in the LA-side information communication device 100 and the control unit 220 in the RE side information communication device 200 may increase or decrease the memory region and the connection band, in accordance with changes in the rate at which transfer data is generated, i.e., changes in the number of cameras (data "sources") that serve as image data acquisition terminals.

The relationship between each terminal (camera) and the memory region may be linked in a one-to-one relationship, and it is not necessary to fix the memory region to be designated. Although the details will be described later, the designated memory region may be allocated definitely or dynamically from the empty memory region. In addition, each time, the allocation area can be increased as necessary.

For this purpose, a condition of each memory region is managed in three states, that is, a state of waiting for transferring, or transferring, to the RE, a write state, and a newly writable state. In the LA, when a region in the newly writable state is reduced, the region is increased, and an increase in the memory region is requested for the RE.

Specifically, the example of FIG. 14 shows a memory region in a state of holding data during transfer from the LA to the RE, a memory region in a state of holding data during reception in the LA, and a memory region in a state of holding data during processing in the RE.

The above memory allocation control and memory state management are performed by the control unit 120. However, this is an example, and means (example: a smart NIC 11, an RDMA-NIC 12, an external device, or the like) other than the control unit 120 may be performed. Operations of a communication system shown in FIG. 14 will be described hereinafter.

As shown in FIG. 14, 80 cameras are connected to the LA. Each camera encodes each frame at a maximum of 500 KB. The high frame rate is, for example, 1000 FPS. 80 cameras are connected, and information that each camera encodes each frame at a maximum of 500 KB and outputs image data at 15 FPS is reported from the camera itself or an operation system to an LA-side control unit 120. The control unit 120 may estimate the information from the received data.

The control unit 120 secures two memory regions having the size of 500 kB×80 units as a memory region (that is, a memory region of a physical memory of the smart NIC 11) accessed by the RDMA-NIC 12, based on the indicated information, and divides the secured memory region into areas for every 500 kB. In addition, 5500 kB×80 units are updated sizes.

In the figure of an LA-side memory region as shown in FIG. 14, the area of "000" indicates 20 areas of addresses 0 to 19, and the size of each area is 500 kB. The same applies to other areas. That is, 80 areas of 500 kB corresponding to the number of cameras are secured in each memory region.

In order to prevent the conflict between read and write, two areas are allocated for each camera. For example, the area of address 0 and the area of address 80 are assigned to the camera 1, and the area of address 1 and the area of address 81 are assigned to the camera 2.

Since the frame rate of the image of each camera is 15 FPS, a total rate of 80 units (=data transfer rate from the LA to the RE) is 0.5 MB×8×15×80=60 Mbps×80=4.8 Gbps. Therefore, the control unit 120 and the control unit 220 allocate a band of 60 Mbps×80 units+β to an RDMA-NIC pair between the LA and the RE. β (beta) represents allocation of a band with a margin, and it is sufficient to allocate a header overhead according to a protocol for capsuling and to include other control messages, for example, about 10%.

The central memory (physical memory of the central memory card 23) in the RE information communication device 200 holds data for five frames of images. Therefore, the control unit 210 secures five memory regions (update sizes) having a size of 500 kB×80 units, and divides the secured memory regions into areas for every 500 kB. In the figure of the memory region on the RE side of FIG. 14, the area of "000" indicates 20 areas of addresses 0 to 19, and the size of each area is 500 KB. The same applies others.

As to the allocation of the areas to each camera, for example, the areas 0, 80, 160, 240, and 320 are allocated to the camera 1, and the areas 1, 81, 161, 241, and 321 are allocated to the camera 2.

When the memory is copied from the LA to the RE, an area for a copy destination is rotated. Such rotation may be realized, for example, by specifying the area to be copied in a case where a sender-side control unit 120 enqueues a transmission request in a transmission queue. Alternatively, the RDMA-NIC 12 itself may control the rotation. Further, the rotation may be realized when the RE-side control unit 220 specifies an area to be copied, in a case where the RE-side control unit 220 enqueues a received request to specify a memory region in a receiver queue by the RDMA Read operation. Alternatively, the RDMA-NIC 24 itself may control the rotation.

The TCP service in the smart NIC 11 alternately writes image data received from each camera in an area of the camera. For example, the image data of the frame 1 received from the camera 1 is written in the area of address 0, and the image data of the frame 2 received from the camera 1 is written in the area of address 80. While the image data of the frame 2 are written in the area of address 80, the image data of the area of address 0 are read by the RDMA-NIC 12 and transferred to the RE side. Therefore, the image data of the frame 3 received from the camera 1 is written in the area of address 0. Such processing is executed for each camera.

The data transferred from the RDMA-NIC 12 to the RE side are stored in an area corresponding to the camera of the transmission source of the data in the central memory by the RDMA-NIC 24 of the RE side. In the example shown in FIG. 14, the area "080" to "140" are shown to be data under LA-RE transfer, that is, data under writing.

In the RE-side information communication device 200, a plurality of programs corresponding to the purpose are run on the CPU card and the XPU card. Each program accesses the data of a central memory card by the DMA, or performs copy transfer. In the example shown in FIG. 14, the data "000" that has been stored before the data being transferred is stored in the physical memory of the XPU by DMA transfer, and the process is executed by the XPU.

The virtual memory address and the physical memory address in the RDMA-NIC 24 of the RE may be linked in a one-to-one relationship, and it is not necessary to fix the designated memory region. In order to store the time-series data, the physical memory address designated by the virtual memory address may be changed over time.

For example, the physical memory address corresponding to the virtual memory address=1 is changed as 81, 82, 83, 84, . . . , in response to the time lapse as 1, 2, 3, 4, . . . . Thus, the time series data sequentially transmitted by designating the virtual memory address=1 can be stored in the physical memory in the order of time series, and processing efficiency can be improved. This control may be performed by the RDMA-NIC 24 or by the control unit 220.

Further, in the RE, when there is a plurality of physical devices (cards or the like provided with an XPU and a physical memory) of transfer destinations from the RDMA-NIC 24, the virtual memory address and the physical memory device relationship may be adjusted so that the load of the physical devices becomes even. For example, when the load is increased, the corresponding destination may be changed to another physical device. This control may be performed by an RDMA-NIC 24 or by a control unit 220.

Further, in RE, when a certain physical device fails to function, the physical device may be made highly reliable by changing the corresponding destination to another physical device. This control may be performed by the RDMA-NIC 24 or by the control unit 220.

In the RE, N copies may be performed to improve the reliability of data. That is, a plurality of physical memory addresses may be mapped to one virtual memory address, and a value received by the RDMA-NIC 24 for the virtual memory address may be written in the plurality of physical addresses. At this time, instead of writing the same value in a plurality of physical addresses, a result of an operation such as RSE (Reed Solomon Erasure) may be written. Further, in the conversion processing for data reliability improvement, a function capable of securing security by secret sharing may be used.

In order to improve the reliability of data, N copies may be performed by optical multicast. That is, one LA may be copied simultaneously to a plurality of REs by optical multicast to achieve high reliability.

Effects of First Embodiment

By the technique according to the first embodiment, the CPU operation of the information communication device in the local aggregation node (LA) can be reduced, and the transfer of large-capacity data between the local aggregation node (LA) and a server side (RE) on the NW located at a remote place can be realized at a high speed and with a low delay.

Further, since the CPU is not interposed in the transfer of data collected from the terminals, a large number of terminals can be accommodated with a smaller number of devices. Further, since there is no flow control such as TCP and the time required for data transfer can be shortened, for example, an AI application requiring instantaneous analysis and reaction can be realized.

Second Embodiment

Next, a second embodiment will be described.

In a system for providing a service for collecting and analyzing a large number of sensor information, the conventional technology is designed and constructed for a specific limited purpose. Therefore, when a service for a certain purpose is desired to be provided, it is necessary to construct an infrastructure such as a camera according to the purpose and to individually construct a system for analyzing sensor data such as acquired images for the service. In addition, when the TCP/IP service of the OS layer in a communication device installed in an aggregation node for collecting data of a large number of sensors and cameras and transferring the data to another node is operated by a CPU together with a data reception program, a CPU load is increased if transfer data becomes huge.

For example, in the case of providing a new service by an application server in accordance with the trend of the society, it has to be constructed from a data collection and analysis system. That is, the conventional technique has a problem that it is difficult to provide various arbitrary services by using data collected from a plurality of terminals. Hereinafter, a second embodiment of the present invention solving these problems will be described.

Example of System Configuration

Figure 15:
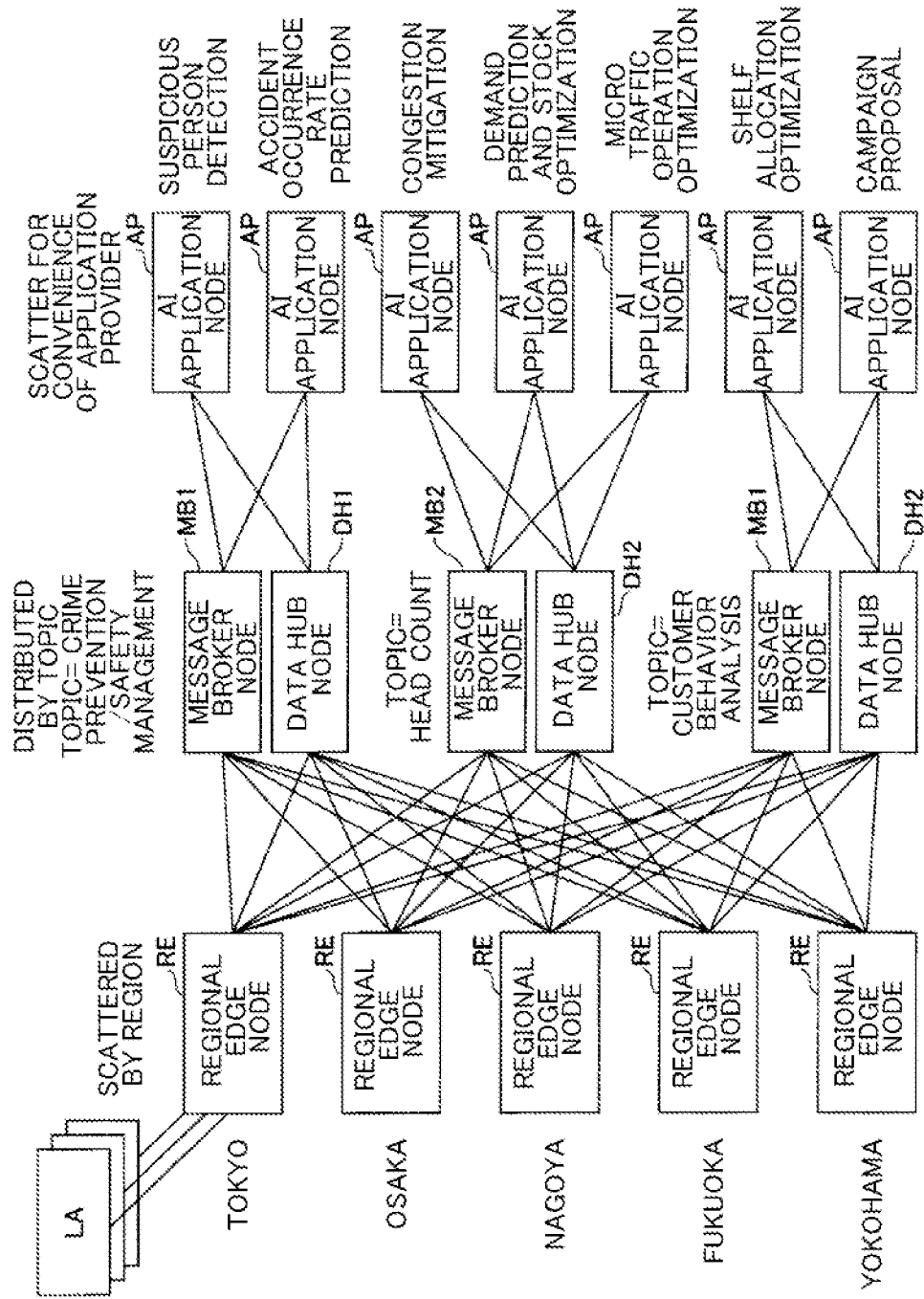
FIG. 15 is a diagram showing a configuration example of the whole data processing system according to a second embodiment.

FIG. 15 shows an example of the configuration of the data processing system according to the second embodiment. The second embodiment is based on the technique of the first embodiment, and FIG. 15 corresponds to a detailed description of the configuration from the regional edge node (RE) to the application node (AP) in the system configuration shown in FIG. 8. In the second embodiment, since the AI application is assumed as an application operating in the application node, the AI application node is described as a concrete example of the application node.

As shown in FIG. 15, there are a plurality of regional edge nodes (RE), message broker nodes (MB), data hub nodes (DH), and AI application nodes (AP), respectively. Between the regional edge node (RE) and the data hub node (DH), and between the data hub node (DH) and the AI application node (AP), they are connected, for example, by an optical network, respectively. The message broker node (MB) and the data hub node (DH) may be collectively constituted by one node (one device).

In the second embodiment, memory allocation is fixed in advance according to the characteristics of the use case, thereby reducing the intervention of the CPU as much as possible, and the service of LA <-> RE transfer & AI service is executed at a low load. Here, communication between the regional edge node (RE) and the data hub node (DH) and between the data hub node (DH) and the AI application node (AP) will be described by way of example. Although it is not essential to use the RDMA, by using the RDMA together, it is possible to reduce the delay of communication between a regional edge node (RE) and an AI application node (AP), thus, the node aggregation effect is improved, and the power consumption of the whole system is reduced. The same effect can be expected when a communication system other than the RDMA is used.

Any communication scheme may be used for communications between the regional edge node (RE) and the message broker node (MB) and between the message broker node (MB) and the AI app node (AP). For example, RDMA may be used, or general IP communication (Internet or the like) may be used.

In the example shown in FIG. 15, the regional edge node (RE) is installed at Tokyo, Osaka, Nagoya, Fukuoka, and Yokohama.

The message broker node (MB) and the data hub node (DH) are distributed for each topic. Note that the "topic" may be called an "event." In the example of FIG. 15, MB1 and DH1 correspond to "topic=crime prevention/safety management," MB2 and DH2 correspond to "topic=head count," and MB3 and DH3 correspond to "topic=customer action analysis."

AI application nodes (APs) are scattered for the convenience of an application provider. In the example of FIG. 15, a plurality of AI application nodes (AP) for performing "suspicious person detection, "accident occurrence rate prediction," "congestion mitigation," "demand prediction and stock optimization," "micro traffic operation optimization," "shelf allocation optimization," "campaign proposal," and the like are arranged on the basis of the plurality of AI application nodes (AP).

The service provided by each AI application node (AP) is not fixed. In the second embodiment, since desired data required for providing the service can be easily acquired, any service can be easily provided.

A plurality of terminals is connected to the local aggregation node (LA) via a LAN as in the first embodiment. The terminal is, for example, a camera (smart camera).

The smart camera is an example of a device for collecting so-called sensor information, and includes an image sensor and a DSP, and has a function of encoding a camera image, compressing it, and transmitting it to the LAN. The terminal provided under the local aggregation node (LA) may be any device as long as it is a sensor device for collecting sensor information.

Example of Device Configuration

An example of the functional configuration of a device arranged in each node will be described below. The configuration of the information communication device 100 arranged in the LA is the same as that of the information communication device 100 shown in FIG. 12 (and FIG. 13) of the first embodiment.

Figure 16:
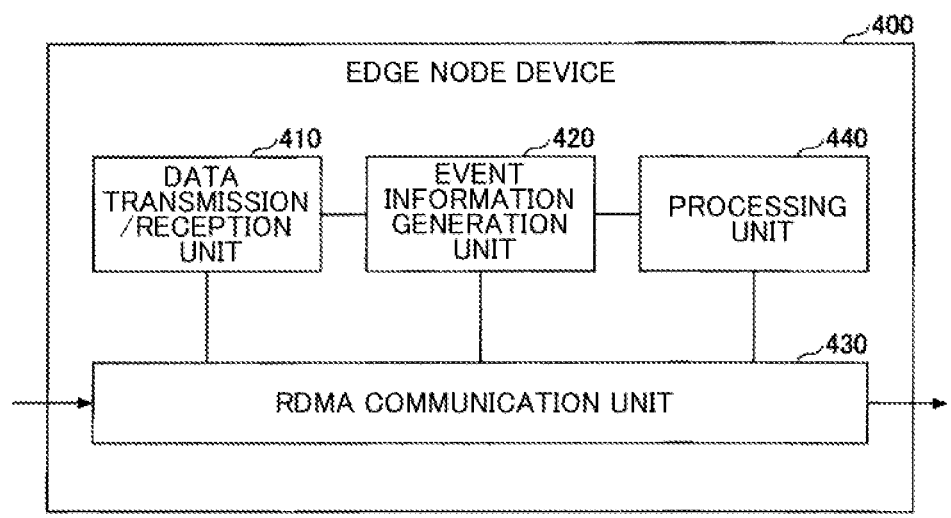
FIG. 16 is a diagram showing the configuration of an edge node device.

FIG. 16 shows an example of the configuration of an edge node device 400 provided in a regional edge node (RE). The function of the edge node device 400 is basically the same as that of the RE side information communication device 200 shown in FIG. 12 (FIG. 13) of the first embodiment, but in the second embodiment, since event information generation and transmission and data transmission are performed, the structure shown in FIG. 16 includes functions related to this point. The edge node device 400 may be called an event information generating device.

As shown in FIG. 16, the edge node device 400 includes a data transmission/reception unit 410, a control unit 440, an RDMA communication unit 430, and an event information generation unit 420. The data transmitting/receiving unit 410, the control unit 440, and the event information generation unit 420 are functional units realized by a CPU, an XPU, a physical memory, a user program (application), and the like. The RDMA communication unit 430 corresponds to an RDMA-NIC.

The data transmission/reception unit 410 receives data transmitted from the LA side, via the RDMA communication unit 430, and stores the data in a physical memory. The data transmission/reception unit 410 transmits data to the data hub node device corresponding to the event information by using the RDMA communication unit 430.

When transmitting data to the data hub node device, the data is transmitted to the data hub node device corresponding to event information (topic) corresponding to the data to be transmitted. Further, as the address of the memory region of the data storage destination in the data hub node device, the address of the memory region corresponding to the area to which the edge node device 400 of the data transmission source belongs is designated.

The event information generation unit 420 performs data analysis by an XPU or the like on data received from the LA side, generates event information on the basis of a result of the analysis, and transmits the event information to the message broker device corresponding to the event information. The event information includes information indicating a topic, information of an analysis result, information (address or the like) for identifying a storage destination (a data hub node device of a storage destination and its memory region) of the event information, and the like.

That is, the event information generation unit 420 includes generation means for receiving data collected from a plurality of terminals, generating event information from the data, and transmitting the generated event information to the broker device.

The data transmission/reception unit 410 and the RDMA communication unit 430 include transmission means for transmitting data corresponding to the event information to a data hub node device corresponding to the event information generated by the generation means among a plurality of data hub node devices different for each event information.

The control unit 440 grasps the size and update rate of data on the basis of information received from the LA-side control unit 120 or the operation system 250, secures a memory region used by the RDMA communication unit 430 on the basis of the size and update rate of data, and secures a network band. The control unit 440 calculates a time for holding data in the RE on the basis of the data processing time or the like, and secures memory regions of the number corresponding to the data holding time.

Figure 17:
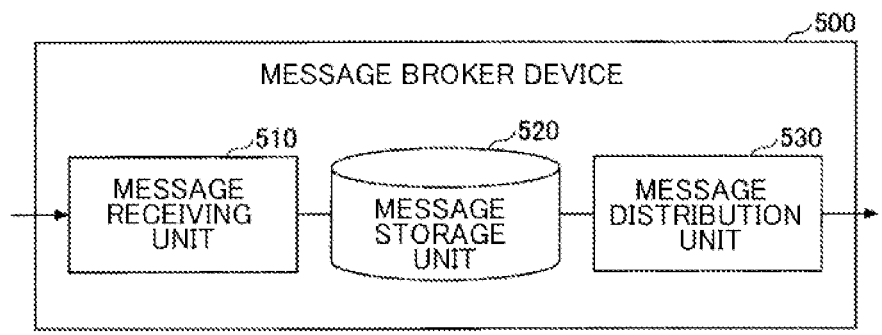
FIG. 17 is a diagram showing the configuration of a message broker device.

FIG. 17 shows an example of the functional configuration of the message broker device 500 provided in the message broker node (MB). The message broker device 500 may be called a broker device. It is assumed that the message broker device 500 in the second embodiment has the function of the broker in the publishers/subscriber model.

As shown in FIG. 17, the message broker device 500 includes a message receiving unit 510, a message storage unit 520, and a message distribution unit 530. The message receiving unit 510 receives a message (specifically event information) about a certain topic from the distributor (RE), and stores the received message in a message storage unit 520. The message distribution unit 530 transmits a message of a topic to a subscriber (here, an AI application node) who subscribes the topic.

Figure 18:
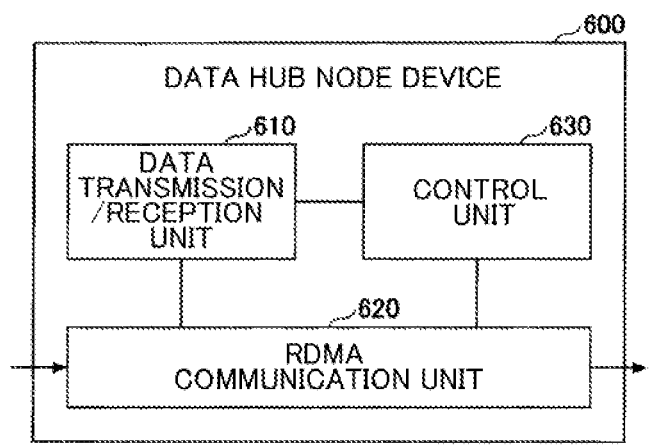
FIG. 18 is a diagram showing the configuration of a data hub node device.

FIG. 18 shows an example of the functional configuration of the data hub node device 600 provided in the data hub node (DH). As shown in FIG. 18, the data hub node device 600 includes a data transmission/reception unit 610, a control unit 630, and an RDMA communication unit 620. The data transmission/reception unit 610 and the control unit 630 are functional units implemented by a CPU, a physical memory, a user program (application), and the like. The RDMA communication unit 620 corresponds to an RDMA-NIC.

The data transmission/reception unit 610 receives data from the edge node device 400 via an RDMA communication unit 620, and stores the data in a physical memory. The data transmission/reception unit 610 issues a transmission instruction for performing data transmission to the AI application node device 700 to the RDMA communication unit 620, and performs data transmission by the RDMA. The control unit 630 secures a memory region used by the RDMA communication unit 620, secures a network band, and the like.

Figure 19:
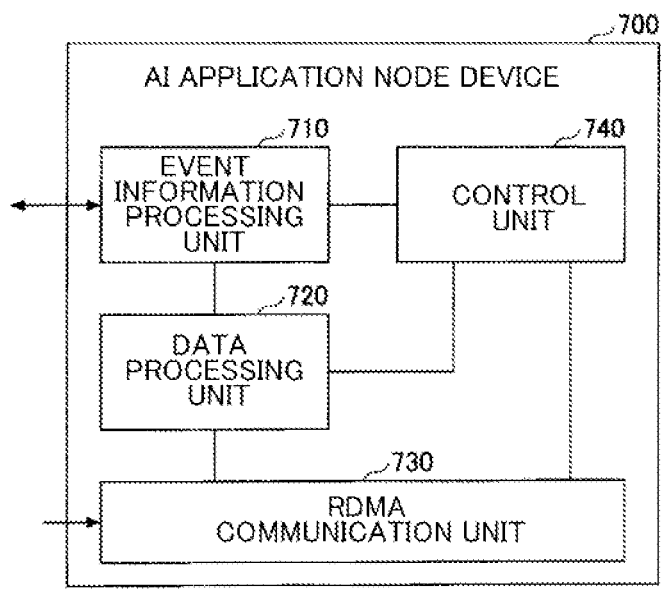
FIG. 19 is a diagram showing the configuration of an AI application node device.

FIG. 19 shows an example of a functional configuration of an AI application node device 700 provided in an AI application node (AP). As shown in FIG. 19, an AI application node device 700 includes an event information processing unit 710, a data processing unit 720, an RDMA communication unit 730, and a control unit 740. The event information processing unit 710, the data processing unit 720, and the control unit 740 are functional units implemented by an XPU, a CPU, a physical memory, a user program (application), and the like. The RDMA communication unit 730 corresponds to an RDMA-NIC. The AI application node device 700 may be referred to as a data processing apparatus.

The event information processing unit 710 acquires event information from the message broker device 500 and processes the event information. That is, the event information processing unit 710 includes acquisition means for acquiring event information corresponding to a specific service from the message broker device.

The data processing unit 720 receives data from the data hub node device 600 via the RDMA communication unit 730, stores the data in a physical memory, and executes processing by an XPU or the like. The control unit 740 secures a memory region used by the RDMA communication unit 730, secures a network band, and the like.

That is, the data processing unit 720 and the RDMA communication unit 730 include processing means for acquiring the data from a data hub node device storing the data corresponding to the event information on the basis of the event information acquired by the acquisition means, and executing processing using the data.

The AI application node device 700 may include a pool of processors constituting the data processing unit 720, and the pool or a part of the pool may be allocated to the user.

For example, an AI application node device 700 includes a plurality of XPUs, and the plurality of XPUs are defined as an XPU pool. For example, the XPU pool is divided into a plurality of units, and the divided pools are allocated to each user.

Further, a plurality of XPU pools having a plurality of XPUs may be provided. For example, when there are an XPU pool 1, an XPU pool 2, and an XPU pool 3, the XPU pool 1 is allocated to the user A, the XPU pool 2 can be allocated to the user B and the XPU pool 3 can be allocated to the user C.

For a user to which the XPU pool is allocated, data to be processed is transmitted to the AI application node device 700 from a data collection system (or a data hub node device 600 of the present embodiment) prepared by the user himself/herself. In the AI application node device 700, data of the user is transferred to an XPU pool allocated to the user, and calculation processing for the data of the user is executed. Thus, by assigning the XPU pool to the user, the logic of calculation processing can be provided as a service.

Example of Processing Sequence

Figure 20:
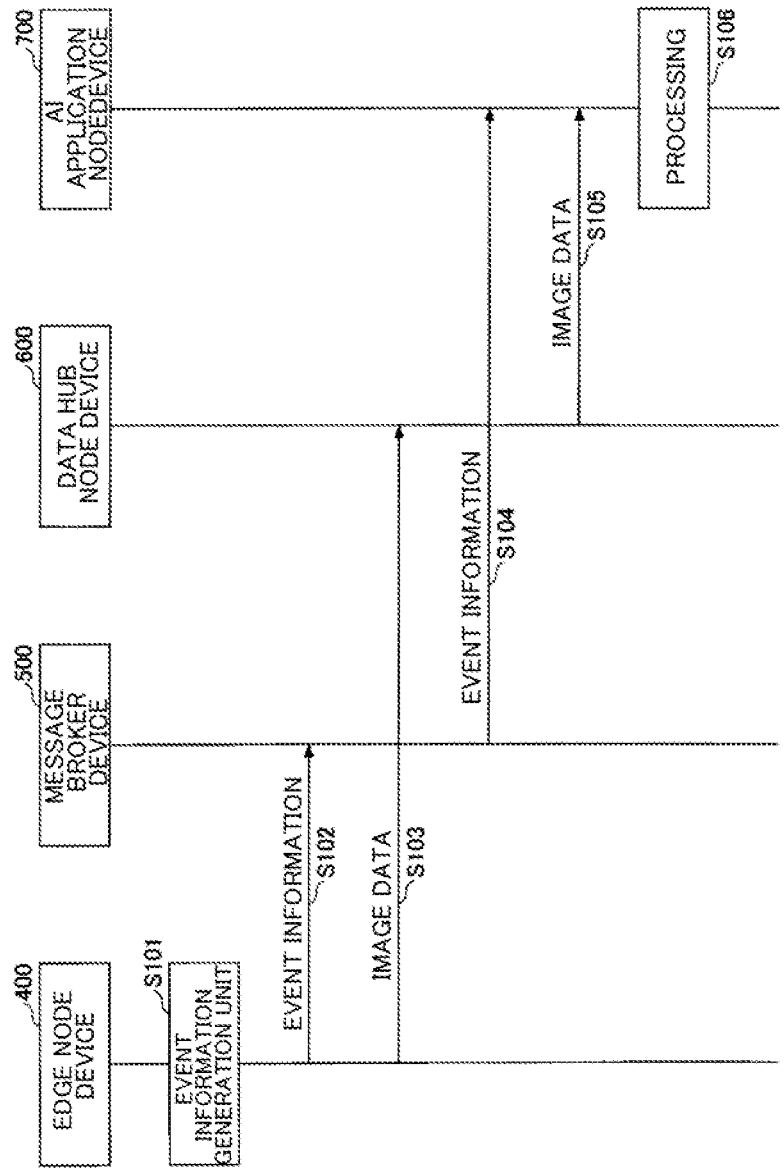
FIG. 20 is a diagram for describing an operation example of the data processing system according to the second embodiment.

An example of the processing flow in the data processing system according to the second embodiment will be described with reference to the sequence diagram of FIG. 20. Here, an explanation will be given on the assumption that the data to be analyzed is image data (video data) transmitted from the camera.

A platform for providing data to an AI application node device 700 (data processing apparatus) is configured by a configuration having an edge node device 400 (event information generating apparatus) and a data hub node device 600. A platform having the edge node device 400 and the data hub node device 600 may be called a data providing system. A device for acquiring data from the data providing system and performing data processing is not limited to the AI application node device 700. For example, an application server prepared by a user may acquire data from a data providing system and perform data processing.

In S101, an event information generation unit 420 of an edge node device 400 detects an event from object detection information obtained by analyzing image data received from LA, and generates event information related to the event. In S102, an event information generation unit 420 transmits the generated event information to a message broker device 500 of a topic related to the event information.

For example, the event information generation unit 420 generates event information having "head count" as a topic when a newly recognized person image is obtained as object detection information. For example, the event information generation unit 420 generates event information having "crime prevention" as a topic when acquiring a person image detected in a specific area requiring monitoring as object detection information. For example, when acquiring a person image detected in a store or a shop area as the object detection information, the event information generation unit 420 generates event information having "customer action analysis" as a topic.

The event information may include information obtained by analysis together with the topic. For example, the event information having "head count" as a topic may include the count result of the number of persons.

The data transmission/reception unit 410 transfers object image data attached to the event information to the data hub node device 600 corresponding to the event information via an RDMA communication unit 430 (S103). In this case, the event information generation unit 420 includes a virtual memory address of the data hub node device 600 of the transfer destination in the event information to be transmitted in S102.

The event information processing unit 710 of the AI application node device 700 acquires event information from an event broker device 500 in S104. The event information is, for example, event information corresponding to a specific service provided by the AI application node device 700.

When the event information is event information to be processed, the event information processing unit 710 determines that the event is to be processed, and requests the data processing unit 720 to perform processing. For example, the event information processing unit 710 compares the previous event information with the current event information, and determines that the event is to be processed when there is a change in the information.

When processing an event, when image data is necessary together with the event information, the data processing unit 720 acquires image data corresponding to the event information from the data hub node device 600 by using address information included in the event information, and executes the processing (S105, S106).

Hereinafter, a specific configuration will be described.

Example of Connection Structure of Local Aggregation Node (LA) and Regional Edge Node (RE)

An example of the connection structure between the local aggregation node (LA) and the regional edge node (RE) is the same as that in the first embodiment, and is as shown in FIG. 14. The operation is also basically as described in the first embodiment.

That is, the information communication device 100 in the LA has a function of a so-called proxy server, and can perform RDMA communication on a network even when a smart camera or the like does not support RDMA.

As described above, within the information communication device 100 in the LA, the smart NIC 11 that terminates TCP services and writes them to physical memory, and an RDMA-NIC 12 that supports RDMA and transfers data to the optical packet transponder 14 are provided. The image data sent from the smart camera is TCP-terminated in the information communication device 100, transferred to a virtual memory in the RDMA-NIC 12 via a physical memory in the smart NIC 11, and sent to the network side as an optical packet.

An edge node device 400 (corresponding to the information communication device 200 in the first embodiment) in the RE receives data from the LA, performs various data processing, and generates event information or the like.

Figure 21:
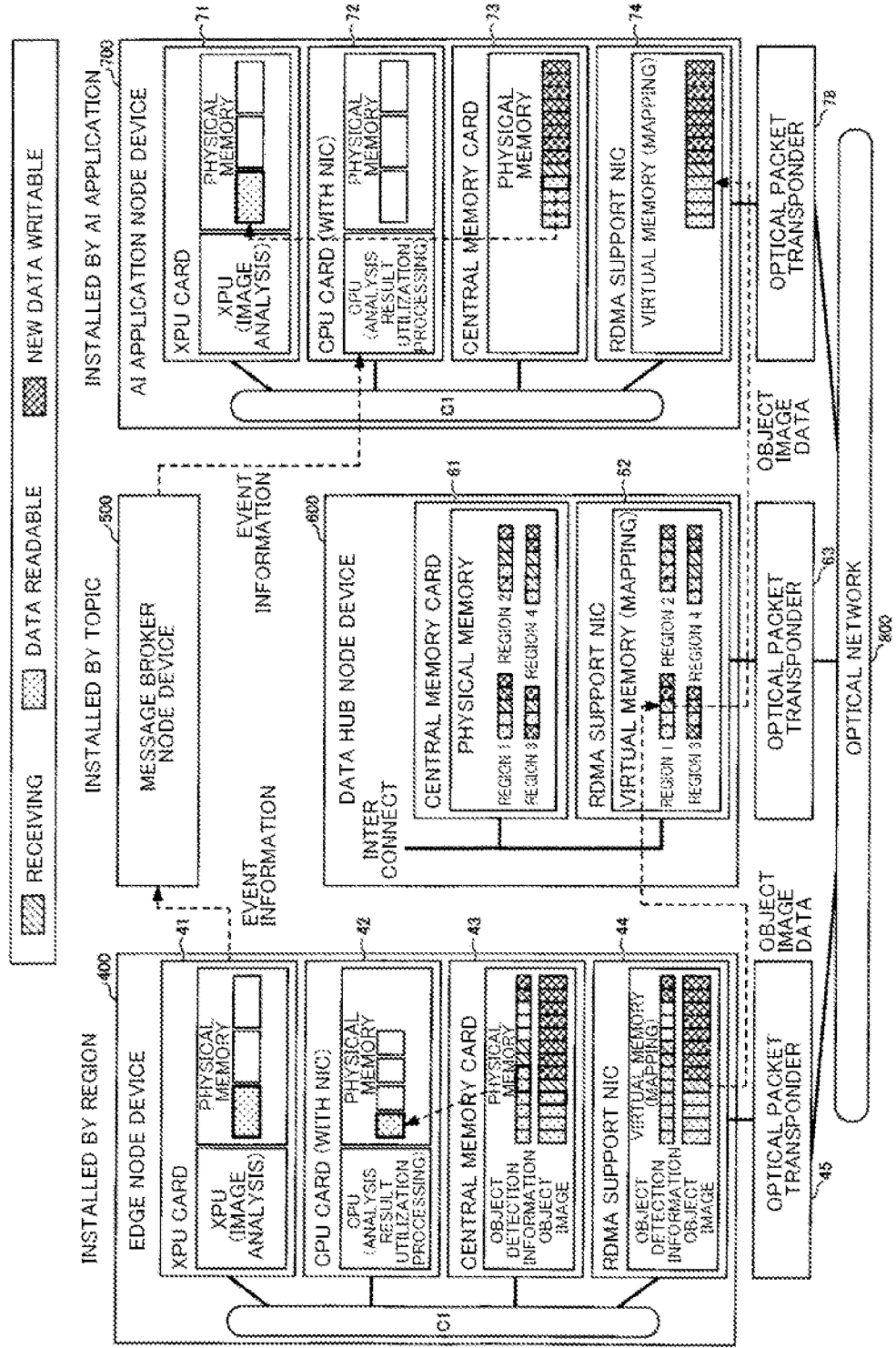
FIG. 21 is a diagram for describing a specific example of the operation of the data processing system according to the second embodiment.

Example of Connection Configuration of Regional Edge Node (RE) to AI Application Node Specific examples of the edge node device 400, the message broker device 500, the data hub node device 600, and the AI application node device 700 will be described with reference to FIG. 21. Each device shown in FIG. 21 shows a configuration close to the mounting of a memory card or the like in order to show the state of data stored in the memory region.

The edge node device 400 in the RE includes an RDMA-NIC 44 for receiving data from the La, a central memory card 43, a CPU card 42, and an XPU card 41 (GPU card or the like) for various data processing.

When the edge node device 400 receives the data from the LA, the edge node device 400 writes the data in the physical memory of the central memory card 43 via the RDMA-NIC 44. The data is stored in, for example, a physical memory of the XPU card 41 by DMA transfer. Here, in the case when the object data is described as image data acquired by the camera, the XPU (e.g., GPU) assembles the image data in the physical memory into a video image and performs image analysis.

In this case, head count in the image, customer behavior analysis, and analysis of whether or not there is a person who behaves like a crime prevention purpose are performed. An existing technique can be used for the analysis scheme.

In addition, the GPU analyzes the data and generates event information corresponding to the analyzed image. The event information includes address information of a memory stored in a data hub node device 600 of a transmission destination of the corresponding image data.

The event information generation may be performed by the CPU. FIG. 21 shows an example in which the CPU performs event information generation.

The event information generation unit 420 (corresponding to the GPU, CPU, and program described above) in the edge node device 400 of the RE transmits event information to the message broker device 500 corresponding to the event information generated by the image analysis. The transmission of the event information is not required to be RDMA, and a scheme such as TCP/IP may be used. The RDMA-NIC 44 transmits image data to the data hub node device 600 corresponding to the event information.

For the determination of a data hub node device 600 of the destination corresponding to the event information, for example, in the edge node device 400, a table storing an optical path address corresponding to the event information is prepared, the data transmission/reception unit 410 refers to the table to determine a destination data hub node device 600.

The data hub node device 600 includes a central memory card 61 and an RDMA-NIC 62. The RDMA-NIC 62 of the data hub node device 600 receives image data for each specific event from a plurality of REs, and stores the data in a memory region corresponding to the RE (area). In the data hub node device 600, the RDMA-NIC 62 reads data from the physical memory and transmits the data to the AI application node device 700.

The message broker device 500 receives the event information from the edge node device 400 of the RE, and transmits the event information to the AI application node device 700 corresponding to the event information.

The AI application node device 700 is a device for providing services such as congestion prediction of a restaurant and taxi allocation management by acquiring information on congestion situations and the number of persons from various image data. As shown in FIG. 21, the construction of the AI application node device 700 is the same as that of the edge node device 400, and includes an XPU card 71, a CPU card 72, a central memory card 73 and an RDMA-NIC 74.

Although one XPU card is shown in the example of FIG. 21, this is an example. One or more XPU pools as described above may be configured by providing a plurality of XPU cards.

The AI application node device 700 previously stores which event information is to be acquired, and inquires of the address of the message broker device 500 corresponding to the corresponding event information about the presence or absence of new event information on the basis of the stored information.

For example, when the AI application node device 700 stores acquisition of the event information of head count and customer trend analysis, the AI application node device 700 inquires the update of the image data (that is, the update of the event information), to a message broker device 500A related to the head count and a message broker device 500B related to the customer trend analysis.

The message broker device 500 transmits the held event information to the AI application node device 700 of the inquiry source when there is the updated event information in response to the inquiry from the AI application node device 700.

The AI application node device 700 compares, for example, the event information acquired this time with the event information received before, and executes event processing when there is a difference. At this time, image data corresponding to the difference is acquired from a data hub node device 600 in which the image data are stored.

Since the event information includes address information of a memory storing image data, the AI application node device 700 can access a specific area of the memory of the data hub node device 600 storing the image data on the basis of the address information.

In the AI application node device 700, an RDMA-NIC 74 writes image data received from a data hub node device 600 into a physical memory of a central memory card 73. The image data is sent to, for example, an XPU card 71 and subjected to image analysis processing. Further, for example, the CPU performs the utilization processing of the analysis result.

Effects of Second Embodiment

According to the technique according to the second embodiment, since only necessary information can be acquired according to the service that the AI application node device desires to provide, various arbitrary services can be easily provided.

When the RDMA is used for transmitting and receiving data, the CPU load is reduced, and the data transfer of transfer can be realized at a high speed and with a low delay.

Example of Hardware Configuration

As described in the first embodiment and the second embodiment, the information communication devices 100 and 200, the edge node device 400, the message broker device 500, the data hub node device 600, the information communication device 100, the information communication device 200, the edge node device 400, the message broker device 500, the data hub node device 600, and the AI application node devices 700 can be implemented, for example, by causing a computer to execute a program. The computer may be a physical computer or a virtual machine on a cloud. The information communication devices 100 and 200, the edge node device 400, the message broker device 500, the data hub node device 600, and the AI application node device 700 are generally called "devices."

Specifically, a device can be implemented by executing a program corresponding to a process that is executed by the device using a hardware resource, such as a CPU, an XPU, ROMA-NIC, and a memory, that is provided in the computer. The program can be recorded in a computer-readable recording medium (such as a portable memory) to be stored or distributed. It is also possible to provide the program through a network such as the Internet or an email.

Figure 22:
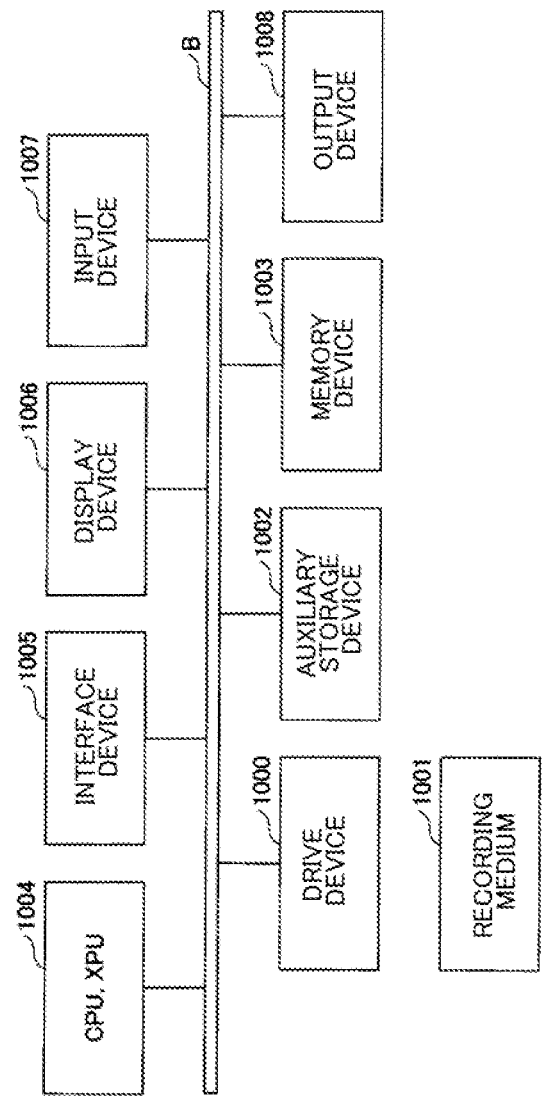
FIG. 22 is a diagram showing a hardware configuration example of a device.

FIG. 22 shows a configuration example of the computer. The computer in FIG. 22 includes a drive device 1000, an auxiliary storage device 1002, a memory device 1003, a CPU (or XPU) 1004, an interface device 1005 (for example, RDMA-NIC), a display device 1006, an input device 1007, and an output device 1008 which are connected to each other via a bus B. Note that, a part of these devices may not be provided. For example, when displaying is not performed, the display device 1006 may not be provided.

The program that realizes processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program need not necessarily be installed from the recording medium 1001 and may be downloaded from another computer via a network. The auxiliary storage device 1002 stores the installed program and also stores necessary files, data, or the like.

The memory device 1003 reads and stores the program from the auxiliary storage device 1002, in response to an instruction to restart the program. The CPU (XPU) 1004 implements functions related to the device, according to the program stored in the memory device 1003. The interface device 1005 is used as an interface for connection to a network. The display device 1006 displays a GUI (Graphical User Interface) or the like according to a program. The input device 1007 is constituted by a keyboard and a mouse, buttons, a touch panel, or the like and is used for inputting various operation instructions. The output device 1008 outputs a calculation result.

Summary of Embodiments

This specification describes at least the devices, schemes, and programs, or the like described in the following manners, corresponding to the first and second embodiments.

Items Corresponding to First Embodiment

First Item

An information communication device to aggregate data transmitted from a plurality of terminals and to transmit the aggregated data to a receiving side includes:
  determination means operable in a first layer that determines an update size of a memory region used for holding the data, based on information related to the data transmitted from the plurality of terminals; and
  setting means that sets a band of a network path of a second layer necessary for communication with the receiving side, based on an update size and an update rate of the data.

Second Item

In the information presentation device described in the first item, the determination means determines the update size, based on a number of the plurality of terminals and an amount of data transmitted from each terminal at the update rate.

Third Item

In the information presentation device described in the first item or the second item, the determination means secures a memory region at least twice as large as the update size as the memory region.

Fourth Manner

The information presentation device described in any one item of the first item to the third item includes RDMA communication means that performs communication in the network path by RDMA.

Fifth Item

In the information presentation device described in the fourth item, the RDMA communication means performs data transmission, based on an RDMA READ operation that is executed from a node device on the receiver side.

Sixth Item

In the information presentation device described in the fourth item or the fifth item, in the node device on the receiver side, a plurality of memory regions of the update size is secured in accordance with a holding time of data that is received from the information communication device, and the RDMA communication means rotates a memory region of a storage destination of data in the node device on the receiver side.

Seventh Item

An information communication scheme executed in an information communication device to aggregate data transmitted from a plurality of terminals and to transmit the aggregated data to a receiver side includes:
  a step by determination means operable in a first layer that determines an update size of a memory region used for holding the data, based on information related to the data transmitted from the plurality of terminals; and
  a step of setting a bandwidth of a network path of a second layer necessary for a communication with the receiving side, based on the update size and the update rate of the data.

Eighth Item

A program for causing a computer to function as each of the means in the information communication device described in any one item of the first item to the six item.

Items Corresponding to Second Embodiment

First Item

An information processing system includes:
  an event information generating apparatus including generation means that receives data collected from a plurality of terminals, generates event information from the data, and transmits the generated event information to a broker device; and
  transmission means that transmits, to a data hub node device corresponding to the event information generated by the generation means, among a plurality of data hub node devices that differ for each event information, data corresponding to the event information; and
  a data processing apparatus including
  acquisition means that acquires event information corresponding to a specific service from the broker device; and
  processing means that acquires data corresponding to the event information from a data hub node device that stores the data, based on the event information acquired by the acquisition means, to execute processing using the data.

Second Item

In the data processing system described in the first item, the event information includes address information of a memory for storing data corresponding to the event information.

Third Item

In the data processing system described in the first item or the second item, the generation means generates the event information by performing image analysis on the collected data.

Fourth Item

In the data processing system described in any one of the first item to the third item, the event information generating apparatus transmits data to the data hub node device by using RDMA, and the data processing apparatus acquires data from the data hub node device by using RDMA.

Fifth Item

An information processing system includes:
an event information generating apparatus including generation means that receives data collected from a plurality of terminals, generates event information from the data, and transmits the generated event information to a broker device; and
transmission means that transmits, to a data hub node device corresponding to the event information generated by the generation means, among a plurality of data hub node devices that differ for each event information, data corresponding to the event information; and
a data hub node device including
receiving means that receives the data corresponding to the event information generated by the generation means; and
transmission means that transmits the data to a data processing apparatus that is acquired the event information.

Sixth Item

An event information generating apparatus includes:
generation means that receives data collected from a plurality of terminals, generates event information from the data, and transmits the generated event information to a broker device;
and
transmission means that transmits, to a data hub node device corresponding to the event information generated by the generation means, among a plurality of data hub node devices that differ for each event information, to transmit data corresponding to the event information.

Seven Item

A data processing apparatus includes:
acquisition means that acquires event information corresponding to a specific service from a broker device; and
processing means that acquires the data from a data hub node device that stores the data corresponding to the event information, based on the event information acquired by the acquisition means, to execute processing using the data.

Eighth Item

In the data processing apparatus described in clause 7, in the data processing apparatus, a pool of processors constituting the processing means is provided, and the pool or a part of the pool is allocated to a user.

Ninth Item

A data processing scheme executed in a data processing system that includes an event information generating apparatus and a data processing apparatus includes:
a generation step in which the event information generating apparatus receives data collected from a plurality of terminals, generates event information from the data, and transmits the generated event information to a broker device;
a transmission step in which the event information generating apparatus transmits, to a data hub node device corresponding to the event information generated by the generation step among a plurality of data hub node devices different for each event information, data corresponding to the event information;
an acquisition step in which the data processing apparatus acquires event information corresponding to a specific service from the broker device; and
a processing step in which the data processing apparatus acquires the data from a data hub node device storing the data corresponding to the event information on the basis of the event information acquired in the acquisition step, and executes processing using the data.

Tenth Item

A program for causing a computer to function as each of the means in the event information generating apparatus described in the sixth item.

Eleventh Item

A program for causing a computer to function as each of the means in the data processing apparatus described in the seventh item or the eighth item.

Although the embodiments are described above, the present invention is not limited to a specific embodiment, and various modifications and changes can be made within the scope of a gist of the present invention set forth in the claims.

REFERENCE SIGNS LIST

LA Local aggregation node
RE Regional edge node
AP Application node
MB Message broker node
DH Data hub node
100 Information communication device
110 Data transmission unit
120 Control unit
130 RDMA communication unit
200 Information communication device
210 Data receiving unit
220 Control unit
230 RDMA communication unit
250 Operation system
300 Optical network
400 Edge node device
410 Data transmission/reception unit
420 Event information generation unit
430 RDMA communication unit
440 Control unit
500 Message broker device
510 Message receiving unit
520 Message storage unit
530 Message distribution unit
600 Data hub node device
610 Data transmission/reception unit
620 RDMA communication unit
630 Control unit
700 AI application node device
710 Event information processing unit
720 Data processing unit
730 RDMA communication unit
740 Control unit 1000 Drive device
1001 Recording medium
1002 Auxiliary storage device
1003 Memory device
1004 CPU
1005 Interface device
1006 Display device
1007 Input device
1008 Output device

The invention claimed is:

1. A data processing system comprising:
an event information generating apparatus including
first circuitry configured to
receive data that is collected from a plurality of terminals,
generate event information from the data,
transmit the generated event information to a broker device, and
transmit, to a data hub node device corresponding to the generated event information, among a plurality of data hub node devices that differ for each event information, data corresponding to the event information; and
a data processing apparatus including
second circuitry configured to
acquire the event information corresponding to a specific service, from the broker device,
acquire the data corresponding to the acquired event information, from the data hub node device that stores the data corresponding to the event information, based on the acquired event information, and
perform processing using the data,
wherein the data received by the first circuitry of the event information generating apparatus is to be transmitted via a second data hub node device that is coupled to the plurality of terminals, the second data hub node device being different from the plurality of data hub node devices, and
wherein the first circuitry is configured to secure a memory region and a network bandwidth for a remote direct memory access (RDMA) communication that is to be performed in the data hub node device, based on a size and an update rate of the data received via the second data hub node device.

2. The data processing system according to claim 1, wherein the event information includes address information of a memory that stores the data corresponding to the event information.

3. The data processing system according to claim 1, wherein the first circuitry is configured to generate the event information, by performing image analysis on the collected data.

4. The data processing system according to claim 1, wherein the first circuitry is configured to transmit the data to the data hub node device by using remote direct memory access (RDMA), and the second circuitry is configured to acquire the data from the data hub node device by using the RDMA.

5. A data providing system comprising:
an event information generating apparatus including first circuitry configured to
receive data that is collected from a plurality of terminals,
generate event information from the data, and
transmit the generated event information to a broker device, and
transmit, to a data hub node device corresponding to the generated event information, among a plurality of data hub node devices that differ for each event information, data corresponding to the event information; and
the data hub node device including
second circuitry configured to
receive the data corresponding to the generated event information, and
transmit the data to a data processing apparatus configured to acquire the event information,
wherein the data received by the first circuitry of the event information generating apparatus is to be transmitted via a second data hub node device that is coupled to the plurality of terminals, the second data hub node device being different from the plurality of data hub node devices, and
wherein the first circuitry is configured to secure a memory region and a network bandwidth for a remote direct memory access (RDMA) communication that is to be performed in the data hub node device, based on a size and an update rate of the data received via the second data hub node device.

6. The data processing system according to claim 1, wherein in the data processing apparatus, a pool of the first circuitry is provided, and the pool or a portion of the pool is allocated to a user.

7. A data processing method executed in a data processing system that includes an event information generating apparatus and a data processing apparatus, the data processing method comprising:
receiving, by the event information generating apparatus, data that is collected from a plurality of terminals;
generating, by the event information generating apparatus, event information from the data;
transmitting, by the event information generating apparatus, the generated event information to a broker device;
transmitting, by the event information generating apparatus, to a data hub node device corresponding to the generated event information, among a plurality of data hub node devices that differs for each event information, the data corresponding to the event information;
acquiring, by the data processing apparatus, event information corresponding to a specific service, from the broker device;
acquiring, by the data processing apparatus, the data from a data hub node device that stores the data corresponding to the event information, based on the acquired event information;
performing processing using the data;
transmitting the data to the event information generating apparatus via a second data hub node device that is coupled to the plurality of terminals, the second data hub node device being different from the plurality of data hub node devices; and
securing, by the event information generating apparatus, a memory region and a network bandwidth for a remote direct memory access (RDMA) communication that is to be performed in the data hub node device, based on a size and an update rate of the data received via the second data hub node device.

8. The data processing system according to claim 1, wherein the first circuitry is configured to calculate a time period for the data hub node device to retain data, based on a data processing time period of the data processing apparatus, and secure a number of memory areas corresponding to the calculated time period.

\* \* \* \* \*